US012740553B2

(12) United States Patent
Maia et al.

(10) Patent No.: US 12,740,553 B2
(45) Date of Patent: Sep. 22, 2026

(54) SYSTEMS AND METHODS FOR CONTROLLING A BOOM ASSEMBLY OF AN AGRICULTURAL APPLICATOR

(71) Applicant: CNH Industrial America LLC, New Holland, PA (US)

(72) Inventors: Mario Rodrigues Maia, Piracicaba (BR); Roberto Honório da Silva, Piracicaba (BR); Paulo José de Andrade Alves, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 936 days.

(21) Appl. No.: 17/873,450

(22) Filed: Jul. 26, 2022

(65) Prior Publication Data

US 2023/0022730 A1 Jan. 26, 2023

(30) Foreign Application Priority Data

Jul. 26, 2021 (BR) .......................... 1020210147040

(51) Int. Cl.

| | |
|---|---|
| ***A01M 7/00*** | (2006.01) |
| ***A01C 23/00*** | (2006.01) |
| ***B05B 1/20*** | (2006.01) |
| ***B05B 15/68*** | (2018.01) |

(52) U.S. Cl.

CPC ......... *A01M 7/0057* (2013.01); *A01C 23/008* (2013.01); *A01M 7/0075* (2013.01); *B05B 1/20* (2013.01); *B05B 15/68* (2018.02)

(58) Field of Classification Search

CPC .............. A01M 7/0057; A01M 7/0075; A01M 7/0089; B05B 1/20; B05B 15/68; A01C 23/008

See application file for complete search history.

(56) References Cited

U.S. PATENT DOCUMENTS

| | | | | |
|---|---|---|---|---|
| 4,394,968 A | | 7/1983 | Tyler | |
| 4,595,140 A | * | 6/1986 | Harden | A01M 7/0075 239/167 |
| 4,634,051 A | * | 1/1987 | Dudley | A01M 7/0078 239/168 |
| 5,142,800 A | | 9/1992 | Hales et al. | |
| 5,988,528 A | | 11/1999 | Krohn et al. | |

(Continued)

FOREIGN PATENT DOCUMENTS

EP 3501252 B1 * 5/2024 .......... A01C 21/007

*Primary Examiner* — Darren W Gorman
(74) *Attorney, Agent, or Firm* — Dority & Manning, P.A.

(57) ABSTRACT

A boom assembly for an agricultural applicator includes a frame supporting a boom arm pivotably coupled to the frame and rotatable about a first axis. A first actuation assembly is pivotably coupled to the frame and the boom arm at a first pivot point for rotation about a second axis on a first side of the first axis. A second actuation assembly is pivotably coupled to the frame and the boom arm at a second pivot point for rotation about a third axis on a second side of the first axis. A sensor is configured to detect data indicative of a relative position of the boom arm relative to the frame. A computing system is configured to activate at least one of the first actuation assembly or the second actuation assembly in response to determining that the boom arm has deviated from a predefined angular range.

20 Claims, 14 Drawing Sheets

(56) References Cited

U.S. PATENT DOCUMENTS

| | | | | |
|---|---|---|---|---|
| 6,119,963 | A * | 9/2000 | Bastin | A01M 7/0075 239/168 |
| 6,293,475 | B1 * | 9/2001 | Sobolik | A01M 7/0078 239/168 |
| 6,719,213 | B1 * | 4/2004 | Ferguson | A01M 7/0075 239/165 |
| 2016/0255769 | A1 * | 9/2016 | Leeb | A01C 23/047 |
| 2016/0286780 | A1 * | 10/2016 | Leeb | A01C 23/008 |
| 2016/0330948 | A1 * | 11/2016 | Schnaider | A01M 7/0085 |
| 2017/0027103 | A1 * | 2/2017 | Grotelueschen | A01M 7/0057 |
| 2018/0184638 | A1 * | 7/2018 | Parling | A01M 7/0057 |
| 2021/0195886 | A1 * | 7/2021 | Smith | A01M 7/0053 |
| 2022/0264859 | A1 * | 8/2022 | Oberheide | A01M 7/0075 |
| 2022/0369531 | A1 * | 11/2022 | Anderson | A01B 63/008 |

* cited by examiner

SYSTEMS AND METHODS FOR CONTROLLING A BOOM ASSEMBLY OF AN AGRICULTURAL APPLICATOR

CROSS-REFERENCE TO RELATED APPLICATION

This application is a continuation-in-part application claiming the benefit of priority under 35 U.S.C. § 119 to Brazilian Patent Application No. BR 10 2021 014704 0, entitled "SYSTEMS AND METHODS FOR CONTROLLING A BOOM ASSEMBLY OF AN AGRICULTURAL APPLICATOR", filed Jul. 26, 2021, which is hereby incorporated by reference in its entirety.

FIELD

The present disclosure relates generally to agricultural applicators, such as agricultural sprayers, and, more particularly, to systems and methods for controlling a boom assembly of the agricultural applicator.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and one or more nozzle assemblies carried by the boom assembly at spaced apart locations. The boom assembly can include a pair of boom arms, with each boom arm extending to either side of the applicator when in an unfolded state. Each boom arm may include multiple boom segments, with each boom segment capable of being associated with a number of nozzle assemblies. Each nozzle assembly typically includes a spray nozzle and an associated nozzle valve to regulate the output of the spray nozzle. With such configurations, a product pump is configured to supply an agricultural product through a pump line to individual boom arm lines coupled in parallel to the pump line, with each boom arm line being coupled in parallel to the respective spray nozzles of such boom segment to allow the agricultural product to be supplied to each spray nozzle.

During an application operation, however, terrain variations may affect a quality of application of the agricultural product to the field. For instance, when the agricultural applicator traverses an incline and/or a decline, a boom arm of the boom assembly may deflect from a default position, which can lead to inconsistent application of the agricultural product. Accordingly, an improved system and method for controlling a boom assembly of the agricultural applicator would be welcomed in the technology.

BRIEF DESCRIPTION

Aspects and advantages of the invention will be set forth in part in the following description, or may be obvious from the description, or may be learned through practice of the invention.

In some aspects, the present subject matter is directed to a boom assembly for an agricultural applicator that includes a frame supporting a boom arm pivotably coupled to the frame and rotatable about a first axis. A first actuation assembly is pivotably coupled to the frame and the boom arm at a first pivot point for rotation about a second axis on a first side of the first axis. A second actuation assembly is pivotably coupled to the frame and the boom arm at a second pivot point for rotation about a third axis on a second side of the first axis. A sensor is configured to detect data indicative of a relative position of the boom arm relative to the frame. A computing system is configured to activate at least one of the first actuation assembly or the second actuation assembly in response to determining that the boom arm has deviated from a predefined angular range.

In some aspects, the present subject matter is directed to a method of operating a boom assembly of an agricultural applicator that includes receiving, through a sensor, data indicative of a rotational position of a boom arm relative to a frame. The method also includes determining, through a computing system, whether the rotational position of the boom arm relative to the frame has deviated from a predefined angular range based on the data. Lastly, the method includes activating, through the computing system, a flow valve, and a control valve to alter a length of at least one of a first actuation assembly or a second actuation assembly when the rotational position of the boom arm relative to the frame exceeds the predefined angular range.

In some aspects, the present subject matter is directed to an adjustment system for a boom assembly of an agricultural applicator. The adjustment system includes a first actuation assembly having a first end portion configured to be pivotably coupled to the frame of the boom assembly and a second end portion configured to be pivotably coupled to a boom arm at a first pivot point for rotation about a second axis on a first side of the first axis. A second actuation assembly has a first end portion configured to be pivotably coupled to the frame and a second end portion configured to be pivotably coupled to the boom arm at a second pivot point for rotation about a third axis on a second side of the first axis. A sensor is configured to detect data indicative of a relative position of the boom arm relative to the frame. A hydraulic circuit is fluidly coupled with the first actuation assembly, the second actuation assembly, and a pump, the hydraulic circuit further comprises a control valve and flow valve. A computing system is configured to activate each of the control valve and the flow valve in response to determining that the boom arm has deviated from a predefined angular range.

These and other features, aspects, and advantages of the present technology will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present technology, including the best mode thereof, directed to one of ordinary skill in the art, is set forth in the specification, which makes reference to the appended figures, in which.

Figure 1:
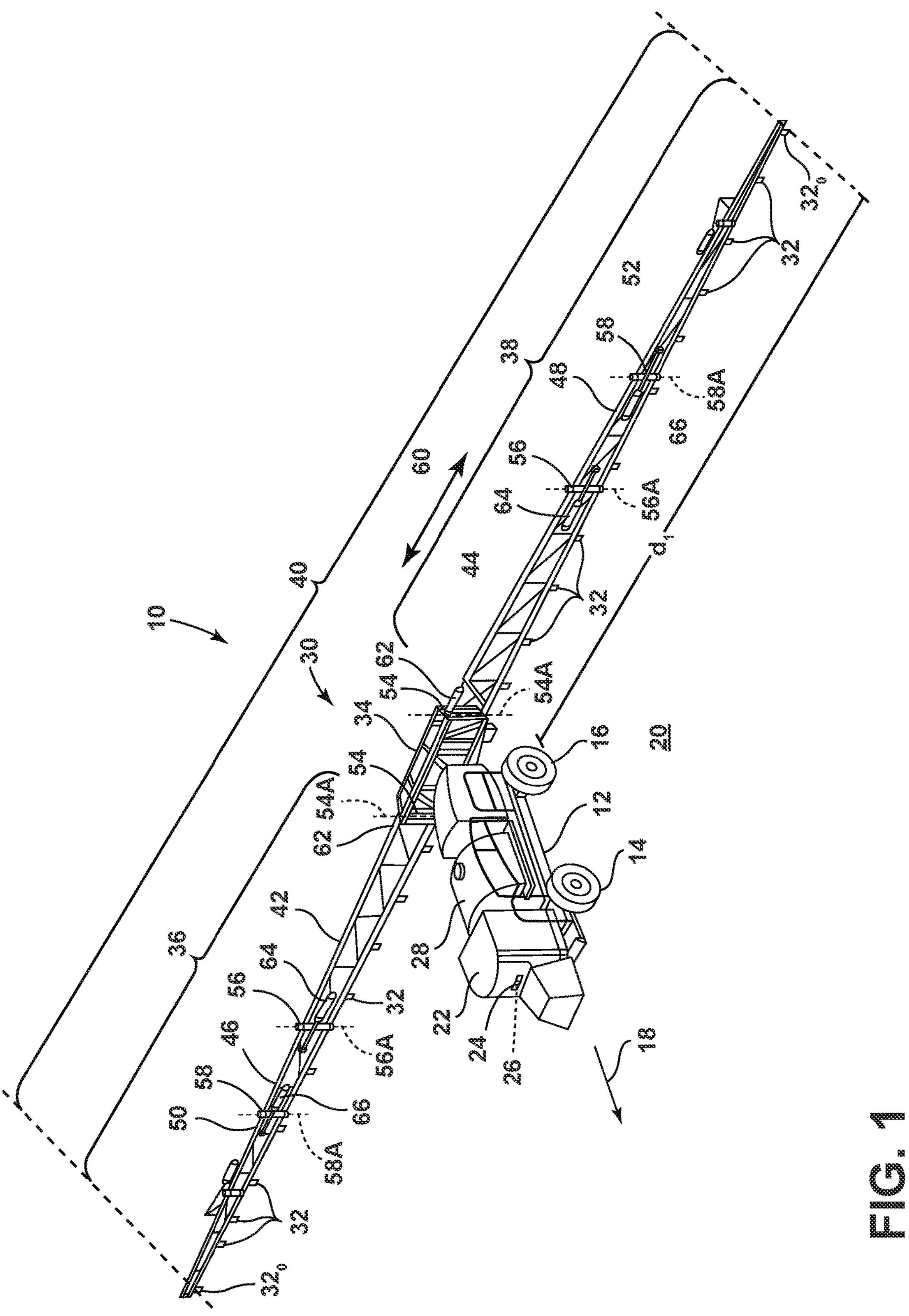
FIG. 1 illustrates a perspective view of some embodiments of an agricultural applicator in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for controlling a boom assembly of an agricultural application, such as a sprayer, during an application operation. In several embodiments, the boom assembly can include a frame and one or more boom arms. In several embodiments, the boom arms are rotatable relative to the frame between a plurality of angles about respective first axes in a fore-aft direction by an actuator coupled with the frame and one of the boom arms. For instance, the plurality of angles can include a storage angle when one or both of the boom arms are positioned in a folded, inoperable position. One or both of the boom arms can also be rotated to a default position relative to the frame in which one or both of the boom arms define a default axis from the frame for operative use of the boom arm. Each boom arm supports a plurality of nozzle assemblies spaced apart along the boom arm.

During an application operation, various forces may cause the boom arms to move in a vertical direction, a fore-aft direction (i.e., a direction of travel), and/or a combination thereof from the default position. For instance, a portion of the boom assembly may be deflected (moved from an assumed or default position) due to dynamic forces encountered when the sprayer traverses a terrain incline and/or a terrain decline. Moreover, as ever larger spray booms and faster ground speeds by the sprayer are implemented during the application operation, even greater amounts of deflection may be experienced. Another contributor to deflection of the boom assembly can be the introduction of boom yaw control, wherein a boom hinge position is purposefully controlled to reduce boom stress, which further moves the nozzles from their assumed or default positions.

When the boom arms deflect in the fore-aft direction, portions of the boom arm and the nozzle assemblies positioned along the boom arm are offset from their positions when compared to the default position, which occurs when the boom arm is free of deflection. A deflection magnitude or offset in position of the individual nozzle assemblies along the boom arm due to the deflection relative to their assumed position can lead to misapplication of the agricultural product as many application routines use the assumed or default position of the nozzle assemblies. Further, since the boom arm is in a cantilevered orientation, the portion of the boom arm that is proximate to the anchor point will deflect less from the default axis than a portion of the boom arm that is further from the anchor point. Therefore, as the boom arm is deflected from the default axis, an outer nozzle assembly will have a greater deflection magnitude from its default position than an inner nozzle assembly that is closer to the anchor point.

To better align the boom assembly to a default position, an adjustment system may rotate the boom arms fore and/or aft. In some instances, the adjustment system can include a first actuation assembly may have a first end portion pivotably coupled to the frame and a second end portion pivotably coupled to the boom arm at a first pivot point for rotation about a second axis on a first side of the first axis. The adjustment system may also include a second actuation assembly having a first end portion pivotably coupled to the frame and a second end portion pivotably coupled to the boom arm at a second pivot point for rotation about a third axis on a second side of the first axis. The first and second actuation assemblies may be configured to move the boom arm fore and aft to minimize a variance between the nozzles in the default position and the nozzles with the boom assembly deflected.

A sensor is operably coupled with the boom assembly and may be configured to provide data indicative of a relative position of the boom arm relative to the frame. A computing system is communicatively coupled to the sensor. Upon receiving data from the sensor, the computing system can determine whether the rotational position of the boom arm relative to the frame has deviated from a predefined angular range based on the data. The computing system may also activate a flow valve and a control valve to alter a length of at least one of the first actuation assembly or the second actuation assembly when the rotational position of the boom arm relative to the frame exceeds the predefined angular range.

Figure 2:
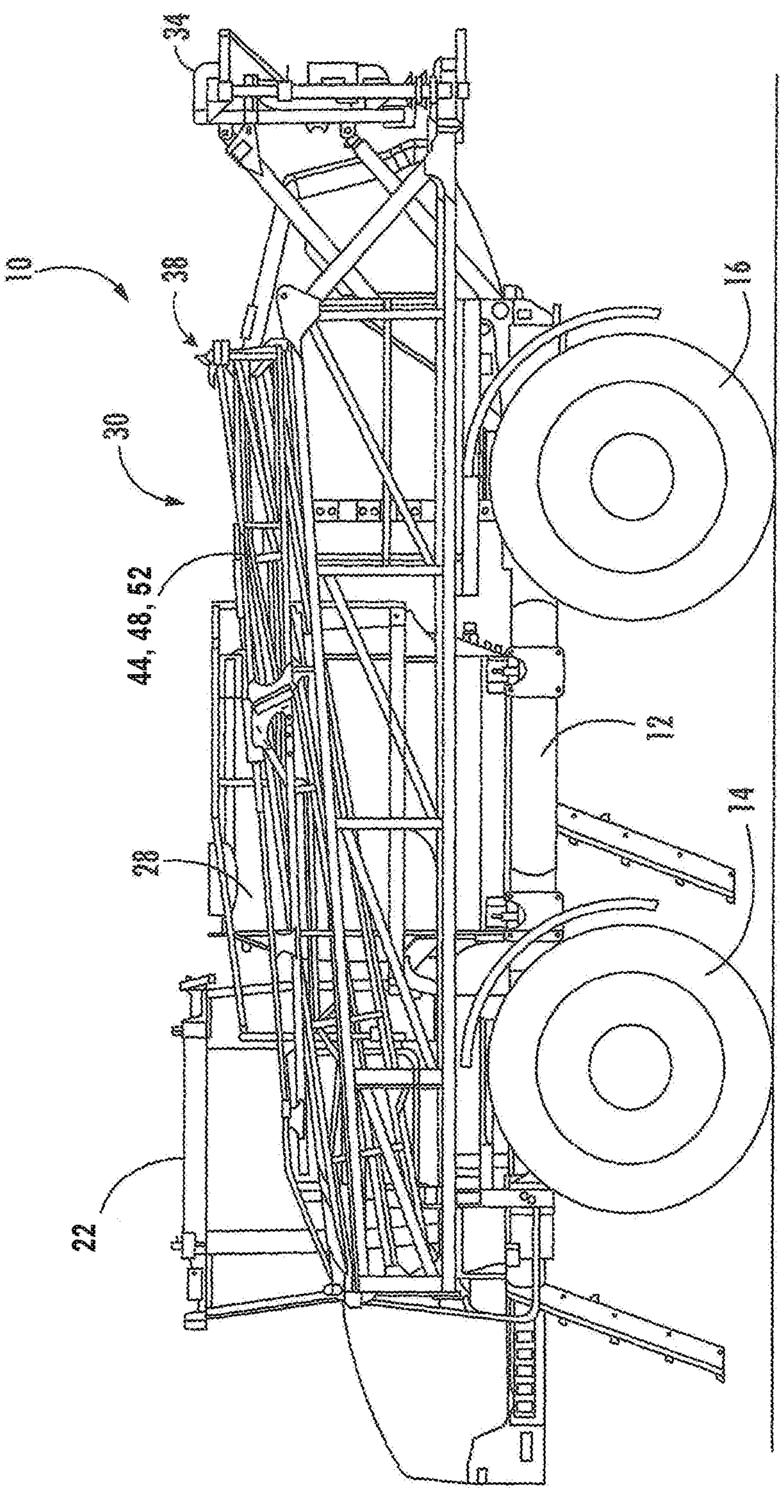
FIG. 2 illustrates a side view of the applicator shown in FIG. 1 in accordance with aspects of the present subject matter, particularly illustrating the applicator in a transport position.

Referring now to FIGS. 1 and 2, an agricultural applicator is generally illustrated as a self-propelled agricultural sprayer 10. However, in alternative embodiments, the agricultural applicator may be configured as any other suitable type of the agricultural applicator configured to perform an agricultural spraying or other product application operations, such as a tractor or other work vehicle configured to haul or tow an applicator implement.

In some embodiments, such as the one illustrated in FIG. 1, the agricultural sprayer 10 may include a chassis 12 configured to support or couple to a plurality components. For example, front and rear wheels 14, 16 may be coupled to the chassis 12. The wheels 14, 16 may be configured to support the agricultural sprayer 10 relative to a ground surface and move the agricultural sprayer 10 in a direction of travel (e.g., as indicated by arrow 18 in FIG. 1) across a field 20. In this regard, the agricultural sprayer 10 may include a power plant, such as an engine, a motor, or a hybrid engine-motor combination, and a transmission configured to transmit power from the engine to the wheels 14, 16.

The chassis 12 may also support a cab 22, or any other form of operator's station, that houses various control or input devices (e.g., levers, pedals, control panels, buttons, and/or the like) for permitting an operator to control the operation of the sprayer 10. For instance, as shown in FIG. 1, the agricultural sprayer 10 may include a user interface or human-machine interface (HMI) 24 for providing messages and/or alerts to the operator and/or for allowing the operator to interface with the vehicle's controller through one or more user-input devices 26 (e.g., levers, pedals, control panels, buttons, and/or the like) within the cab 22 and/or in any other practicable location.

The chassis 12 may also support one or more tanks, such as a product tank 28 and/or a rinse tank, and a boom assembly 30. The product tank 28 is generally configured to store or hold an agricultural product, such as a pesticide(s) (e.g., an herbicide(s), insecticide(s), rodenticide(s), etc.) and/or a nutrient(s). The agricultural product is conveyed from the product tank 28 through a product circuit including numerous plumbing components, such as interconnected pieces of tubing, for release onto the underlying field 20 (e.g., plants and/or soil) through one or more nozzle assemblies 32 mounted on the boom assembly 30 (or the sprayer 10).

In general, each nozzle assembly 32 is configured to dispense an agricultural product stored within an associated tank (e.g., product tank 28) onto the underlying field 20 and/or plants. In this regard, each nozzle assembly 32 may include a nozzle valve and an associated spray tip or spray nozzle. In several embodiments, the operation of each nozzle valve may be individually controlled such that the valve regulates the flow rate of the agricultural product through the associated nozzle assembly 32, and thus, the flow rate of the agricultural product dispensed from the respective spray nozzle. Such control of the operation of the nozzle valve may also be used to achieve the desired spray characteristics for the output or spray fan expelled from the associated spray nozzle, such as a desired droplet size and/or spray pattern. For instance, the nozzle valve may be configured to be pulsed between open/closed positions relative to an orifice of the adjacent spray nozzle at a given frequency and duty cycle (e.g., using a pulse width modulation (PWM) technique) to achieve the desired flow rate and spray characteristics for the respective nozzle assembly 32.

As shown in FIGS. 1 and 2, the boom assembly 30 can include a frame 34 that supports first and second boom arms 36, 38, which may be orientated in a cantilevered nature. The first and second boom arms 36, 38 are generally movable between an operative or unfolded position (FIG. 1) and an inoperative or folded position (FIG. 2). When distributing the agricultural product, the first and/or second boom arm 36, 38 extends laterally outward from the agricultural sprayer 10 to the operative position in order to cover wide swaths of the underlying ground surface, as illustrated in FIG. 1. When extended, each boom arm 36, 38 defines a first lateral distance $d_1$ defined between the frame 34 and an outer nozzle assembly 320 and/or an outer end portion of the boom arms 36, 38. Further, the boom arms 36, 38, when both unfolded, define a field swath 40 between the respective outer nozzle assemblies 320 of the first and second boom arms 36, 38 that is generally commensurate with an area of the field 20 to which the agricultural sprayer 10 covers during a pass across a field 20 to perform the agricultural operation. However, it will be appreciated that in some embodiments, a single boom arm 36, 38 may be utilized during the application operation. In such instances, the field swath 40 may be an area defined between a pair of nozzle assemblies 32 that are furthest from one another in a lateral direction 60.

To facilitate transport, each boom arm 36, 38 of the boom assembly 30 may be independently folded forwardly or rearwardly into the inoperative position, thereby reducing the overall width of the sprayer 10, or in some examples, the overall width of a towable implement when the applicator is configured to be towed behind the agricultural sprayer 10. In some instances, each boom arm 36, 38 of the boom assembly 30 may generally include one or more boom sections. For instance, in the illustrated embodiment, the first boom arm 36 includes three boom sections, namely a first inner boom section 42, a first middle boom section 46, and a first outer boom section 50, and the second boom arm 38 includes three boom sections, namely a second inner boom section 44, a second middle boom section 48, and a second outer boom section 52. In such an embodiment, the first and second inner boom sections 42, 44 may be pivotably coupled to the frame 34. Similarly, the first and second middle boom sections 46, 48 may be pivotably coupled to the respective first and second inner boom sections 42, 44, while the first and second outer boom sections 50, 52 may be pivotably coupled to the respective first and second middle boom sections 46, 48. For example, each of the inner boom sections 42, 44 may be pivotably coupled to the frame 34 at pivot joints 54. Similarly, the middle boom sections 36, 38 may be pivotally coupled to the respective inner boom sections 42, 44 at pivot joints 56, while the outer boom sections 50, 52 may be pivotably coupled to the respective middle boom sections 46, 48 at pivot joints 58.

As is generally understood, pivot joints 54, 56, 58 may be configured to allow relative pivotal motion between the adjacent boom sections of each boom arm 36, 38. For example, the pivot joints 54, 56, 58 may allow for articulation of the various boom sections between a fully extended or working position (e.g., as shown in FIG. 1), in which the boom sections are unfolded along a lateral direction 60 of the boom assembly 30 to allow for the performance of an agricultural spraying operation, and a transport position (FIG. 2), in which the boom sections are folded inwardly to reduce the overall width of the boom assembly 30 along the lateral direction 60. It should be appreciated that, although each boom arm 36, 38 is shown in FIG. 1 as including three individual boom sections coupled along opposed sides of the central boom section, each boom arm 36, 38 may generally have any suitable number of boom sections.

Additionally, as shown in FIG. 1, the boom assembly 30 may include inner fold actuators 62 coupled between the inner boom sections 42, 44 and the frame 34 to enable pivoting or folding between a plurality of angles in a fore-aft direction by an actuator coupled with the frame 34 and one of the one or more boom arms 36, 38. For instance, the plurality of angles can include a storage angle when one or both of the boom arms 36, 38 are positioned in a folded, inoperable position. One or both of the boom arms 36, 38 can also be rotated to a default angle relative to the frame 34 in which one or both of the boom arms 36, 38 extend a default direction from the frame 34 for operative use of the boom arms 36, 38.

Figure 3:
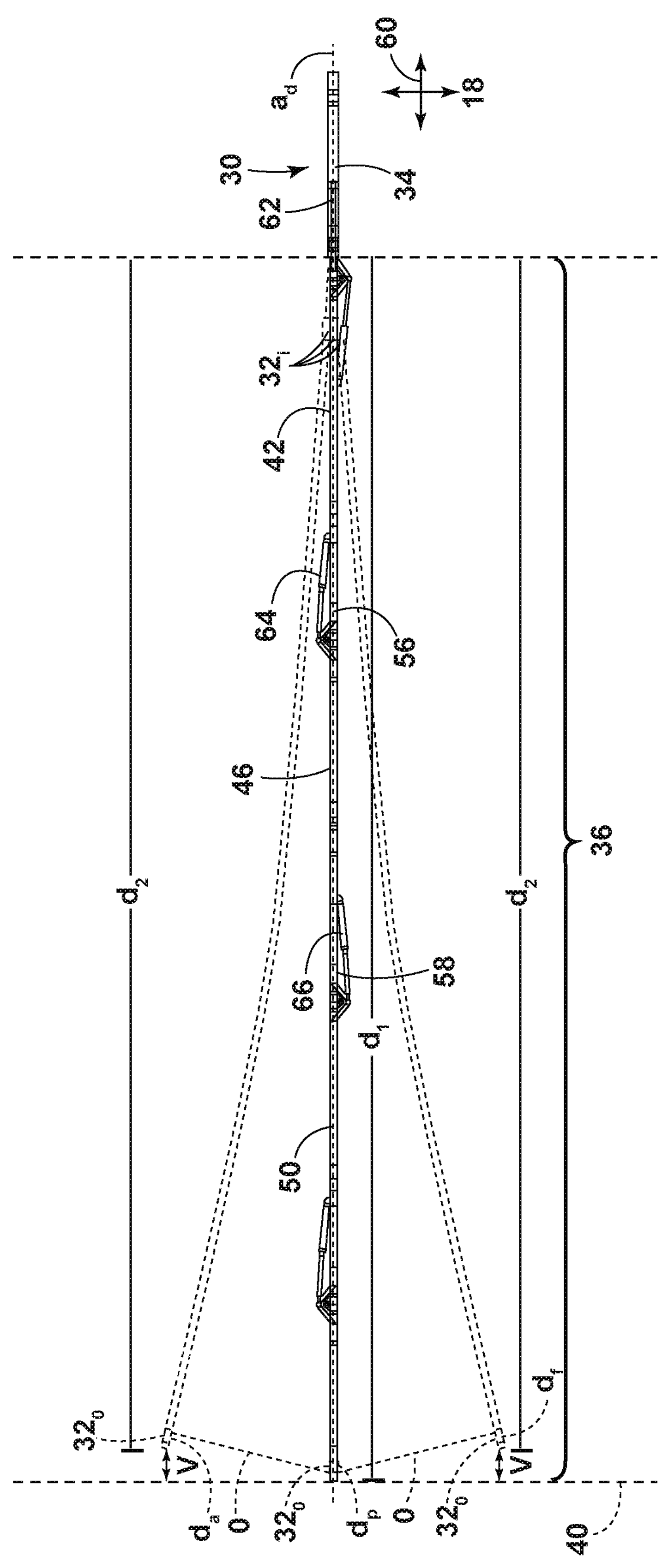
FIG. 3 illustrates a simplified, schematic view of some embodiments of a boom arm of a boom assembly in accordance with aspects of the present subject matter, particularly illustrating the boom arm being deflected in a forward and a rearward direction.

Referring to FIG. 3, prior to performing an agricultural operation with the boom assembly 30, either or both of the boom arms 36, 38 may be configured to extend a first lateral distance $d_1$ away from the sprayer 10 and/or the frame 34 along a default axis $a_d$. In various embodiments, the default axis $a_d$ may generally be offset ninety degrees relative to the vehicle travel direction 18 such that the default axis $a_d$ is generally aligned with the lateral direction 60. The first lateral distance $d_1$ can be defined as a distance between the frame 34 and an outer nozzle assembly 320 and/or an outer end portion of each boom arm 36, 38. Moreover, when the first and second boom arms 36, 38 are extended from opposing sides of the frame 34, the boom arms 36, 38 can define a field swath 40 (FIG. 1) between the outer nozzle assemblies 320 of the first and second boom arms 36, 38, between the outer end portions of the first and second boom arms 36, 38, and/or between laterally outer ends of respective fans dispensed from the outer nozzle assemblies 320 of the first and second boom arms 36, 38 depending on the agricultural operation and/or specific spray operation. Further, in some operations, a single boom arm 36, 38 may be used. In such instances, the field swath 40 may be defined between an outer and an inner operating nozzle assembly **32*i*, 320 and/or the outer operating nozzle assembly 320 and an operating nozzle supported by the frame 34**.

During operation, various forces may be placed on the boom assembly 30 causing the boom arms 36, 38 and, consequently, the nozzle assemblies 32 positioned along the boom arms 36, 38, to be deflected or repositioned relative to the frame 34 and/or sprayer 10. For instance, a portion of the boom assembly 30 may be deflected from an assumed or a default position $d_p$ due to terrain variations (e.g., the sprayer 10 traversing an incline and/or a decline in terrain). In addition, deflection may be caused by high dynamic forces encountered when the sprayer 10 is turned, accelerated, or decelerated. Further, weather variances and/or contact with an object could also lead to deflection of the boom assembly 30.

Once the boom arm 36 is deflected in a fore direction $d_f$ (i.e., a direction of forward movement of the sprayer 10 as indicated by arrow 18 in FIG. 1) and/or in an aft direction da (i.e., an opposing direction of the forward movement of the sprayer 10 as indicated by arrow 18 in FIG. 1) of its default position $d_p$, as generally illustrated in FIG. 3, the outer nozzle assembly 320 may be positioned a second lateral distance $d_2$ from the frame 34, which may be less than the first lateral distance $d_1$ due to a curvature of the boom assembly 30. Accordingly, a lateral variance v is formed between the first and second lateral distances $d_1$, $d_2$. This lateral variance v may lead to a misapplication of an agricultural substance to the underlying field 20, which may be in the form of an overapplication or an underapplication of the agricultural product. For instance, in the area of the underlying field 20 between the frame 34 and the outer nozzle assembly 320 may have an overapplication of the agricultural product applied thereto when the boom arm 36 is deflected, while the portion of the underlying field 20 below the variance v may have an underapplication of the agricultural product applied thereto. In addition to creating a variance v, the deflection of the boom arm 36 also creates an offset between the outer nozzle assembly 320 in the default position $d_p$ and the deflected positions $d_f$, da, which may also lead to inaccuracies during application of the agricultural product to the underlying field 20.

Figure 4:
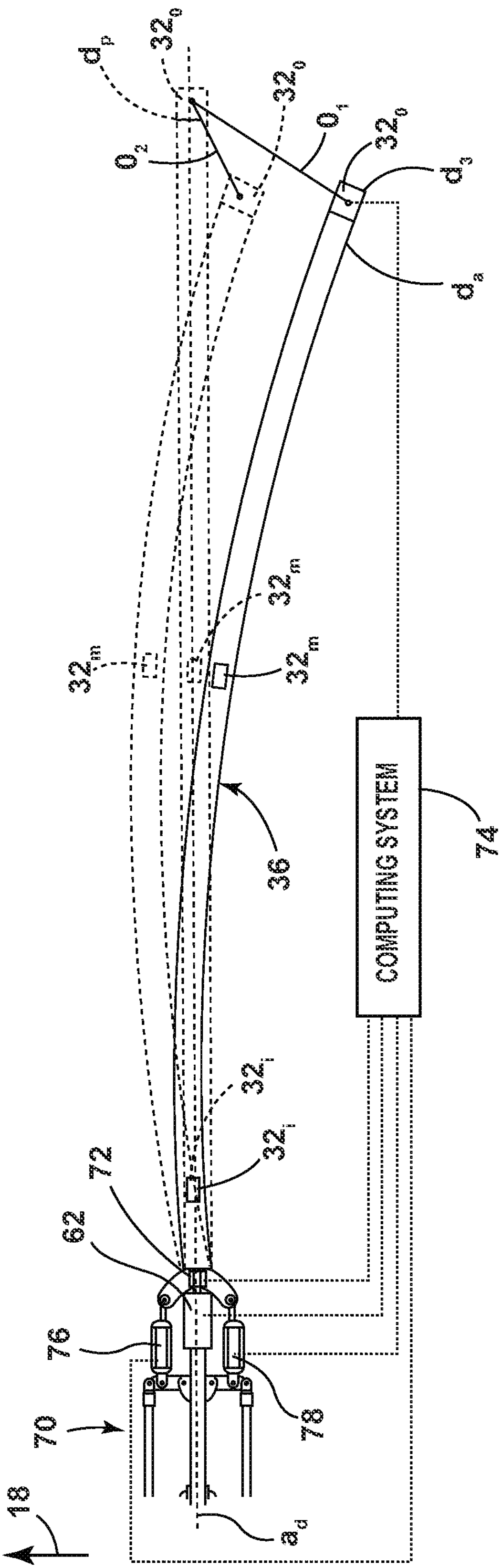
FIG. 4 illustrates a simplified, schematic view of some embodiments of an adjustment system operably coupled with the boom assembly in accordance with aspects of the present subject matter.
Figure 5:
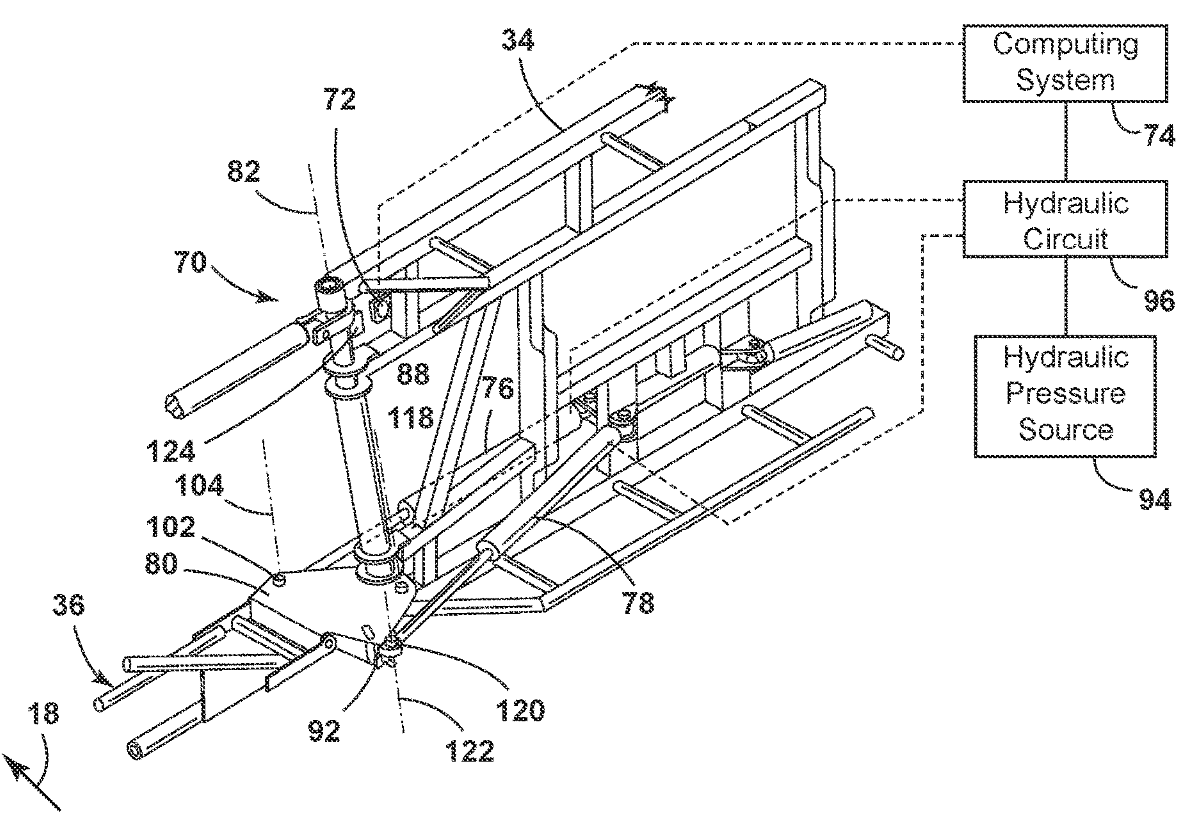
FIG. 5 is an enlarged fragmentary perspective view of the boom assembly in accordance with aspects of the present subject matter.
Figure 6:
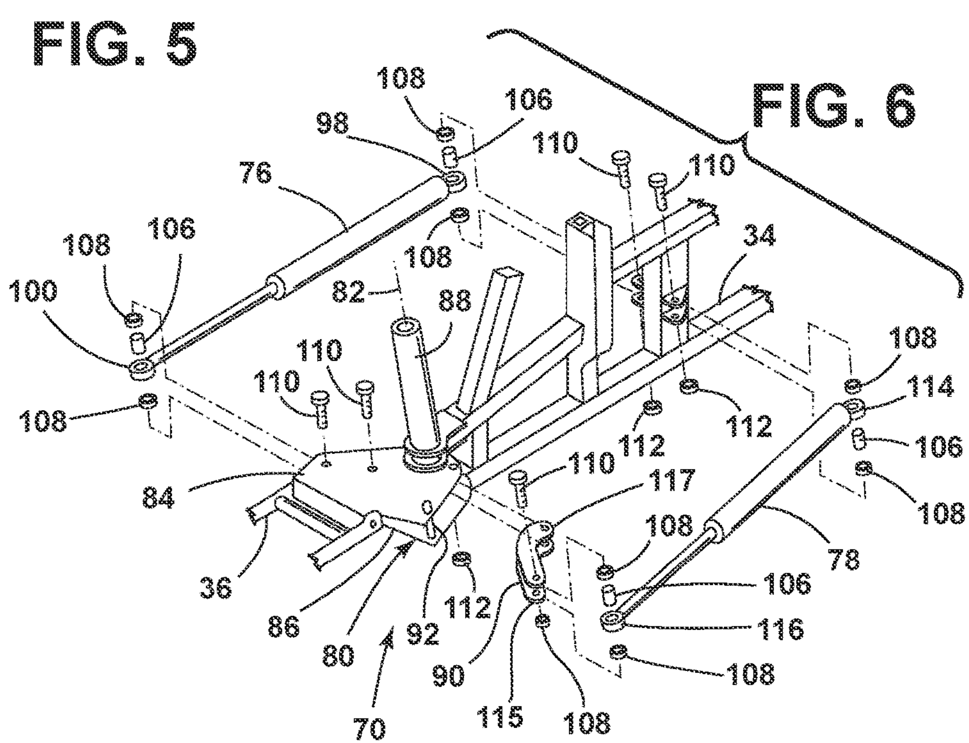
FIG. 6 is an exploded fragmentary perspective view of the boom assembly and the adjustment system of FIG. 5 in accordance with aspects of the present subject matter.

Referring now to FIGS. 4-6, a first adjustment system **70*a* operably coupled with the first boom arm 36 of the boom assembly 30 is illustrated in accordance with aspects of the present disclosure. It will be appreciated that a second adjustment system 70*b* may be operably coupled with the second boom arm 38, which may be designed in a substantially similar manner to the illustrated adjustment system 70. As provided herein, during an application operation, various forces may cause the boom arms 36, 38 to move from the default position in a vertical direction, a fore-aft direction (i.e., a direction of travel), and/or a combination thereof from the default position. For instance, a portion of the boom assembly 30 may be deflected (moved from an assumed or default position) due to dynamic forces encountered when the sprayer 10 traverses a terrain incline and/or a terrain decline. To better align the boom assembly 30 to the default position and/or to minimize the lateral variance v (FIG. 3) that forms with the first boom arm 36 deflected, the first adjustment system 70*a* may be configured to move the first boom arm 36 fore and aft to counteract deflection of the first boom arm 36 caused by the various forces on the first boom arm 36. Likewise, to better align the boom assembly 30 to the default position and/or to minimize the lateral variance v (FIG. 3) that forms with the second boom arm 38 deflected, the second adjustment system 70*b* may be configured to move the second boom arm 38 fore and aft to counteract deflection of the second boom arm 38 caused by the various forces on the second boom arm 38**.

In various embodiments, based on data received from the one or more sensors 72, a computing system 74 can determine whether the deflection magnitude of one of the boom arms 36, 38 deviates from a predefined threshold. The deflection magnitude may be a measure of an estimated variance, an estimated offset between a calculated nozzle assembly position and an assumed or default nozzle assembly position, a detected pressure at one or more fold actuators 62, 64, 66 of the boom arm 36, 38, an estimated curvature of the boom arm 36, 38, a rotation of the boom arms 36, 38, and/or any other metric.

In some embodiments, when the deflection magnitude of one of the boom arms 36, 38 deviates from the predefined threshold, the computing system 74 may activate the adjustment system 70 to reposition the boom arm 36, 38 to minimize the offset between the nozzle assemblies 32 (such as the outer nozzle assembly 320) between the default position and the calculated position of the outermost nozzle based on the calculated deflection magnitude. In various embodiments, the adjustment system 70 may include the first actuation assembly 76 and/or the second actuation assembly 78. Each of the first actuation assembly 76 and/or the second actuation assembly 78 may be operably coupled with the computing system 74. The computing system 74 may be configured to alter a length of the first actuation assembly 76 and/or the second actuation assembly 78, which, in turn, can alter a relative angle between the first boom arm 36 and the frame about axis 82.

In some instances, the computing system 74 is further configured to determine a deflection direction, which may be quantified in a fore/aft direction. Based on the deflection direction, the adjustment system 70 may actuate the first actuation assembly 76 and/or the second actuation assembly 78 to rotate the boom arm 36, 38 such that an inner portion **38*i* of the boom arm 36, 38 is rotated to an opposing side of the default axis $a_d$ from the detected deflection direction to counteract the positional offsets caused by the deflection. For instance, as illustrated in FIG. 4, the boom arm 36, 38 may be deflected in aft direction da causing the outermost nozzle assembly 320 to be displaced from its default position by an offset distance $o_1$. In response, the actuator 62 may rotate the second boom arm 38 from the default axis $a_d$ to an adjusted angle such that the inner portion 38*i* of the boom arm 38 is positioned at least partially fore of the default axis $a_d$ and, thus, on an opposing side of the default from the detected deflection direction. As used herein, the deflection direction is determined by the position of the outer portion of the boom arm 38 relative to the default axis $a_d$. For instance, when the outer portion of the boom arm 38 is deflected aft of the default axis $a_d$, the deflection direction is considered to be in the aft direction. Likewise, when the outer portion of the boom arm 38** is deflected fore of the default axis $a_d$, the deflection direction is considered to be in the fore direction.

Once the boom arm 38 is repositioned to the adjusted angle, the outermost nozzle assembly 320 on the deflected boom arm 38 is offset from the outermost nozzle assembly 320 in the default position by a second offset distance $o_2$, which is less than the first offset distance $o_1$ thereby reducing the deviation between assumed or default position of the outermost nozzle assembly 320. By reducing the deviation between the projected position of the outermost nozzle assembly 320 and the actual position of the nozzle assembly 320, more accurate agricultural product application can be achieved, and/or an application rate along the boom arm 36, 38 may be more consistent than prior to movement of the boom arm 36, 38.

Referring further to FIGS. 5 and 6, the first boom arm 36 can include a mounting portion 80 pivotably coupled to the frame 34 for rotation about an axis 82. In some embodiments, the mounting portion 80 can include a pair of opposing plates 84, 86 through which a shaft 88 may extend. As will be appreciated, the mounting portion 80 may have a variety of alternative configurations and may be pivotably coupled to the frame 34 for rotation about axis 82 by a variety of alternative pivoting mechanisms and structures. As noted above, because the first boom arm 36 is cantilevered from the frame 34, the first boom arm 36 may deflect fore or aft upon traversing uneven terrain. To better align the boom assembly 30, the adjustment system 70 returns the first boom arm 36 to the default position and/or an adjusted position.

In various embodiments, the adjustment system 70 can generally include the first actuation assembly 76, the second actuation assembly 78, a link 90, and a stop surface 92. Each of the first actuation assembly 76 and/or the second actuation assembly 78 may be operably coupled with the computing system 74 that is configured to alter a length of the first actuation assembly 76 and/or the second actuation assembly 78, which, in turn, can alter a relative angle between the first boom arm and the frame 34 about axis 82.

The first actuation assembly 76 may be configured as a force applying member, which may include a hydraulic cylinder-piston assembly fluidly coupled to a source 94 of hydraulic pressure through a hydraulic circuit 96. Additionally or alternatively, the first actuation assembly 76 may be configured as a ballscrew electric actuator, a linear electric actuator, a pneumatic cylinder, a delta drive, and/or any other practicable device.

As illustrated, the first actuation assembly 76 can have a first end portion 98 pivotably coupled to the frame 34 and a second end portion 100 pivotably coupled to the mounting portion 80 of the first boom arm 36 at a first pivot point 102 so as to rotate about an axis 104 on a forward side of axis 82. In the exemplary embodiment, the first and second end portions 98, 100 may be respectively pivotably coupled to the frame 34 and the first boom arm 36 by bushings 106, washers 108, bolts 110, and nuts 112. However, it will be appreciated that any other attachment structure may be used in addition to or in lieu of the components of the illustrated embodiment.

The second actuation assembly 78 may also be configured as a force applying member, which may include a hydraulic cylinder-piston assembly fluidly coupled to a source 94 of hydraulic pressure. Additionally or alternatively, the first actuation assembly 76 may be configured as a ballscrew electric actuator, a linear electric actuator, a pneumatic cylinder, a delta drive, and/or any other practicable device.

As illustrated, the second actuation assembly 78 may have a first end portion 114 pivotably coupled to the frame 34 and an opposite end portion 116 pivotably coupled to the mounting portion 80 of the first boom arm 36 through a link 90. The link 90 can extend between the end portion 116 of the second actuation assembly 78 and the mounting portion 80 of the first boom arm 36. In some instances, the link 90 can have a first end portion 115 pivotably coupled to the second actuation assembly 78 and an opposing end portion 117 pivotably coupled to the mounting portion 80 of the first boom arm 36. As shown in the illustrated embodiment, the first end portion 114 may be pivotably coupled to the frame 34, the second end portion 116 may be pivotably coupled to the link 90, and the link 90 may be pivotably coupled to the mounting portion 80 by bushings 106, washers 108, bolts 110, and nuts 112.

With further reference to FIG. 5, a stop surface 92 can be provided by a member extending between plates 84, 86. The stop surface 92 can engage the link 90 to limit rotation of the link 90 about an axis 118. As a result, the link 90 and the stop surface 92 may cooperate to pivotably couple the second end portion 116 of the second actuation assembly 78 to the mounting portion 80 about two distinct axes depending upon the relative positioning of the mounting portion 80 and the first boom arm 36. In the position shown in FIG. 5, the link 90 is engaged against the stop surface 92. As a result, the second actuation device can apply a force to the mounting portion 80 and the first boom arm 36 at a pivot point 120 about an axis 122.

With further reference to FIGS. 4 and 5, in various embodiments, the adjustment system 70 may further include a sensor 72. The sensor 72 may be configured to provide data indicative of a rotational position of the first boom arm 36 relative to the frame 34 to the computing system 74. In several embodiments, the sensor 72 may be configured as a proximity sensor, such as a LIDAR sensor, a RADAR sensor, an imager, and/or any other type of sensor that is capable of measuring the relative angle between the first boom arm 36 and the frame 34. However, in alternative embodiments, the sensor 72 may additionally or alternatively correspond to an image sensor (an area-type image sensor, such as a CCD or a CMOS image sensor, and image-capturing optics that capture an image of an imaging field of view). In various embodiments, the image sensor may correspond to a stereographic camera having two or more lenses with a separate image sensor for each lens to allow the camera to capture stereographic or three-dimensional images.

In various embodiments, the sensor 72 may detect objects within a field of view, which is then provided to the computing system 74. Further, in some embodiments, a detector assembly 124 may be optically coupled with the sensor 72. As used herein, "optically coupled" means that at least a portion of the detector assembly 124 is positioned with the field of view of the sensor 72 during at least a portion of operation of the adjustment system 70.

Figure 7:
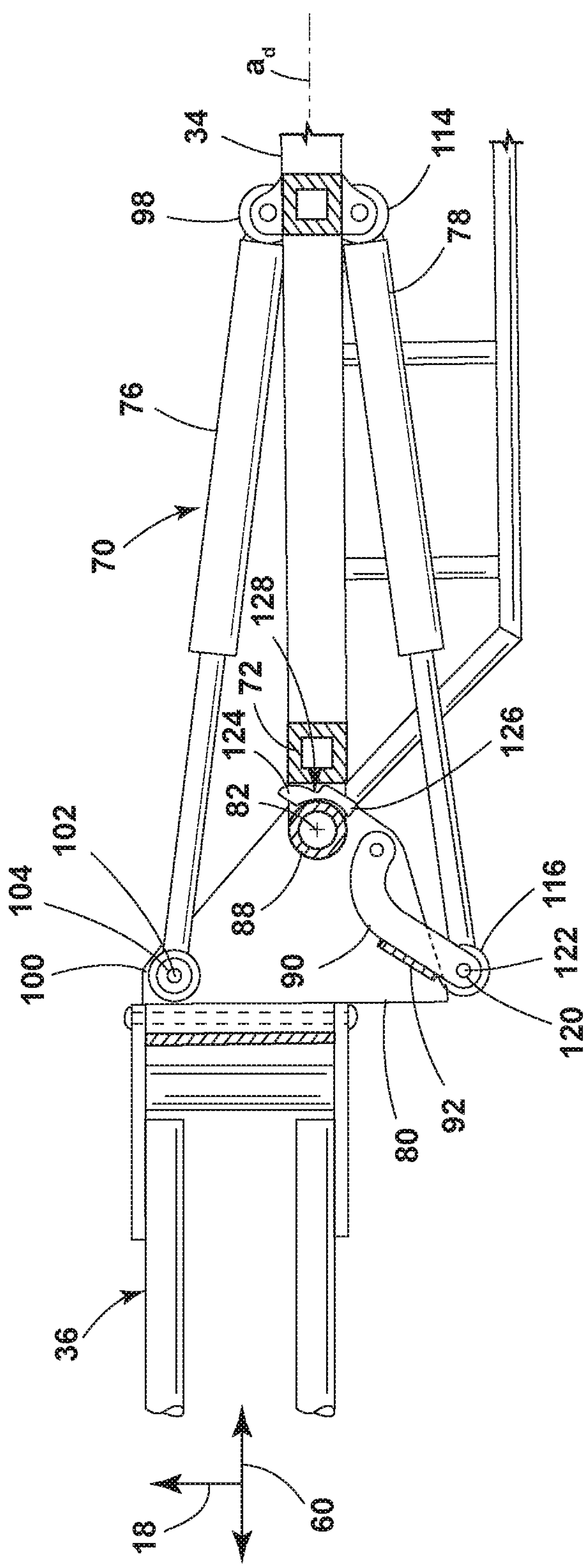
FIG. 7 is a top elevational view of the boom assembly and the adjustment system in a default position in accordance with aspects of the present subject matter.
Figure 8:
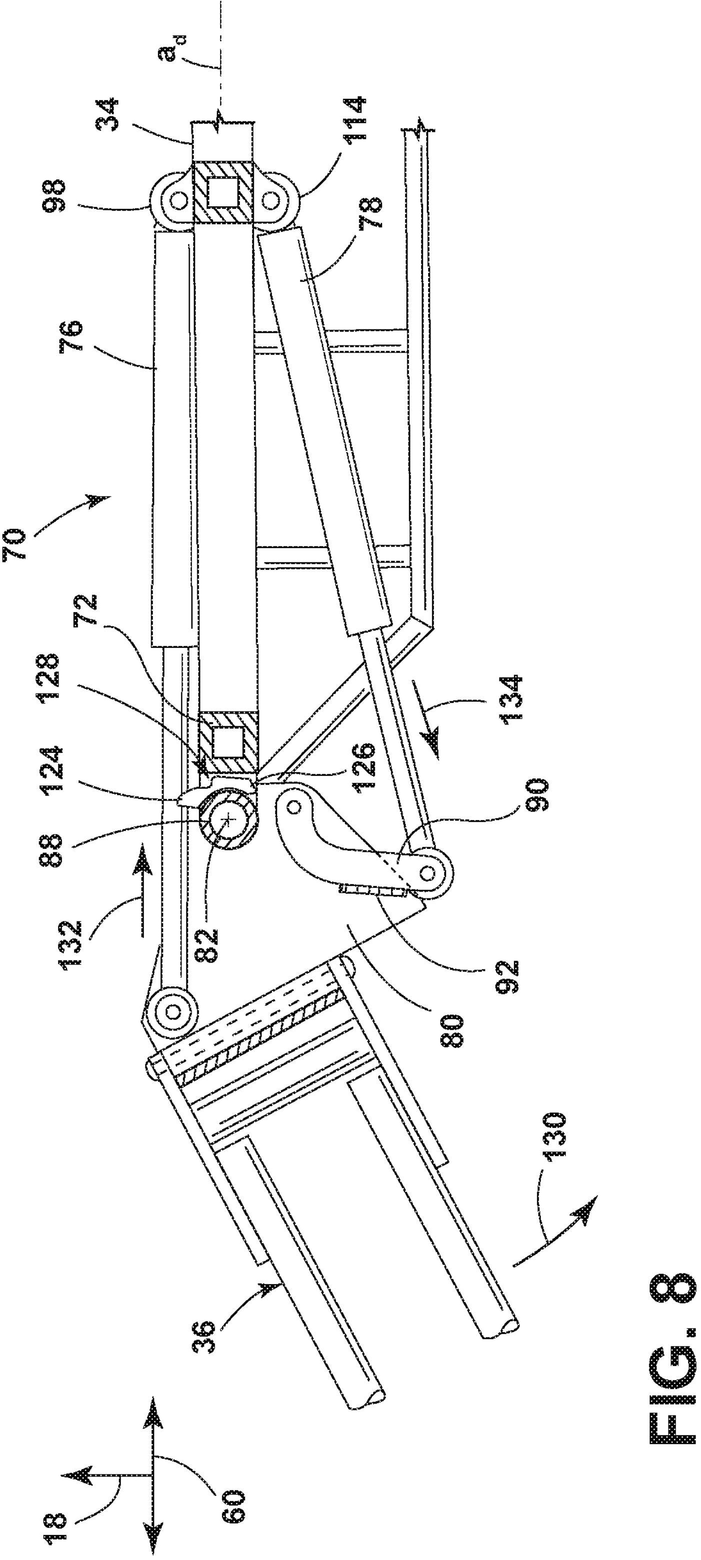
FIG. 8 is a top elevational view of the boom assembly and the adjustment system with a boom arm of the boom assembly pivoted in a first direction in accordance with aspects of the present subject matter.
Figure 9:
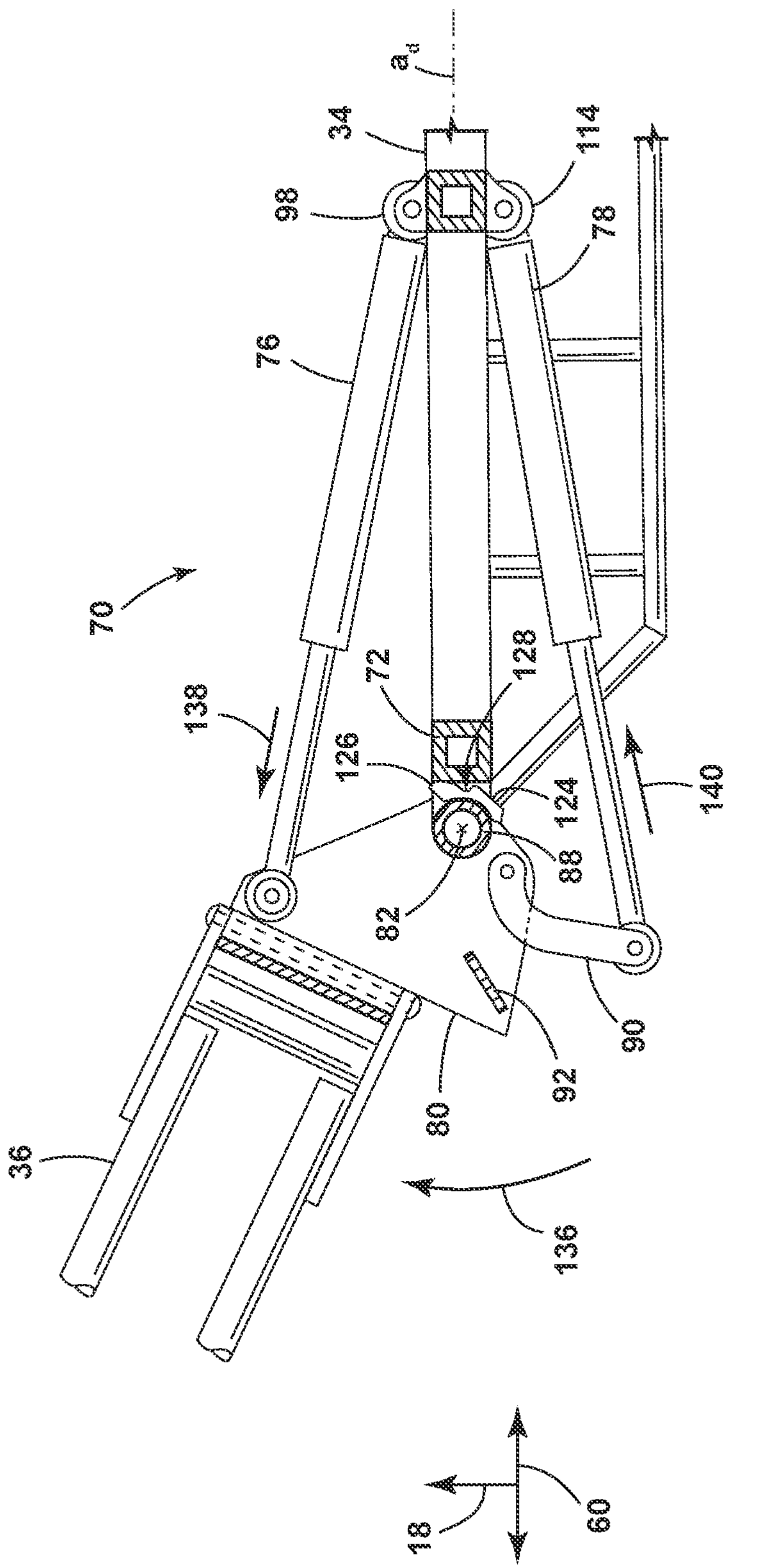
FIG. 9 is a top elevational view of the boom assembly and the adjustment system with a boom arm of the boom assembly pivoted in a second direction in accordance with aspects of the present subject matter.

Referring now to FIGS. 7-9, the adjustment system 70 actuating the first boom arm 36 between the default position, a first position, and a second position are respectively illustrated. It will be appreciated that FIGS. 8 and 9 show the first boom arm 36 deflected fore and aft by an exemplary amount and that the deflection in either direction may be any detectable amount without departing from the scope of the present disclosure.

In the embodiment illustrated in FIG. 7, the sensor 72 is operably coupled with the frame 34 and the detector assembly 124 may be operably coupled with the shaft 88. As such, the sensor 72 may be stationary as the first boom arm 36 rotates relative to the frame 34. However, it will be appreciated that in other embodiments the detector assembly 124 may be generally stationary while the sensor 72 is rotated with the first boom arm 36 without departing from the scope of the present disclosure. Additionally or alternatively, in various embodiments, the detector assembly 124 and the sensor 72 may both rotate without departing from the scope of the present disclosure.

As illustrated, the detector assembly 124 may include a base 126 that defines a locating feature 128 having a predefined width. In some instances, the locating feature 128 may be configured as a cavity within the base 126. In various examples, the predefined width of the locating feature 128 may define the predefined angular range of the first boom arm 36. It will be appreciated, however, that the locating feature 128 may be formed in any other manner without departing from the scope of the present disclosure.

As generally illustrated in FIG. 7, when the first boom arm 36 is in the default spray position, the first boom arm 36 may extend along the lateral direction 60 and generally parallel to a default axis $a_d$ containing axis 82. In the default position, the link 90 can abut the stop surface 92 such that the second end portion 116 is effectively pivotably coupled to the mounting portion 80 at the pivot point 120 about the axis 122. As a result, the second actuation assembly 78 applies force to the mounting portion 80 of the first boom arm 36 at pivot point 120 on a rear side of axis 82 and the default axis $a_d$ while the first actuation assembly 76 applies force to the mounting portion 80 of the first boom arm 36 at pivot point 102 about axis 104 on a front side of axis 82 and default axis $a_d$. Consequently, the first actuation assembly 76 and the second actuation assembly 78 apply opposing torque to the first boom arm 36.

With the first boom arm 36 in the default spray position, the locating feature 128 may be generally aligned with the field of view of the sensor 72 in the lateral direction thereby defining an aligned position. As such, the computing system 74 may be capable of determining that the first boom arm 36 is in a predefined location.

FIG. 8 illustrates the first boom arm 36 and the adjustment system 70 with the first boom arm 36 deflected aft. While moving forward in the direction indicated by arrow 18 and traversing an uphill terrain, the first boom arm 36 may deflect aft in the direction indicated by arrow 130. With the first boom arm 36 deflected in the first position, the locating feature 128 may be rotated fore of the aligned position. As such, the sensor 72 may provide data indicative of the misalignment and/or the direction of misalignment to the computing system 74. In turn, the computing system 74 may activate the first actuation assembly 76 and/or the second actuation assembly 78 to alter a relative angle between the first boom arm 36 and the frame 34. For example, to counteract the deflection of the boom arm 36 caused by the various forces on the boom arm 36, the adjustment system 70 may be configured to move the boom arm 36 in the fore direction. In some instances, to move the boom arm 36 in the fore direction, the first actuation assembly 76 is retracted in the direction indicated by arrow 132 while the second actuation assembly 78 is extended in the direction indicated by arrow 134.

FIG. 9 illustrates the first boom arm 36 and the adjustment system 70 with the first boom arm 36 deflected fore. While moving forward in the direction indicated by arrow 18 and traversing a downhill terrain, the first boom arm 36 may deflect fore in the direction indicated by arrow 136. With the first boom arm 36 deflected fore of a default axis $a_d$, the locating feature 128 may be rotated aft of the aligned position. As such, the sensor 72 may provide data indicative of the misalignment and/or the direction of misalignment to the computing system 74. In turn, the computing system 74 may activate the first actuation assembly 76 and/or the second actuation assembly 78 to alter a relative angle between the first boom arm 36 and the frame 34. In some instances, to counteract the deflection, the first actuation assembly 76 is extended in the direction indicated by arrow 138 while the second actuation assembly 78 is retracted in the direction indicated by arrow 140. As such, the adjustment system 70 may be configured to move the boom arm 36 fore and aft to counteract deflection of the boom arm 36 caused by the various forces on the boom arm 36 to better align the boom assembly 30 to the default position and/or to minimize the lateral variance v (FIG. 3) that forms with the boom arm 36 deflected.

Figure 10:
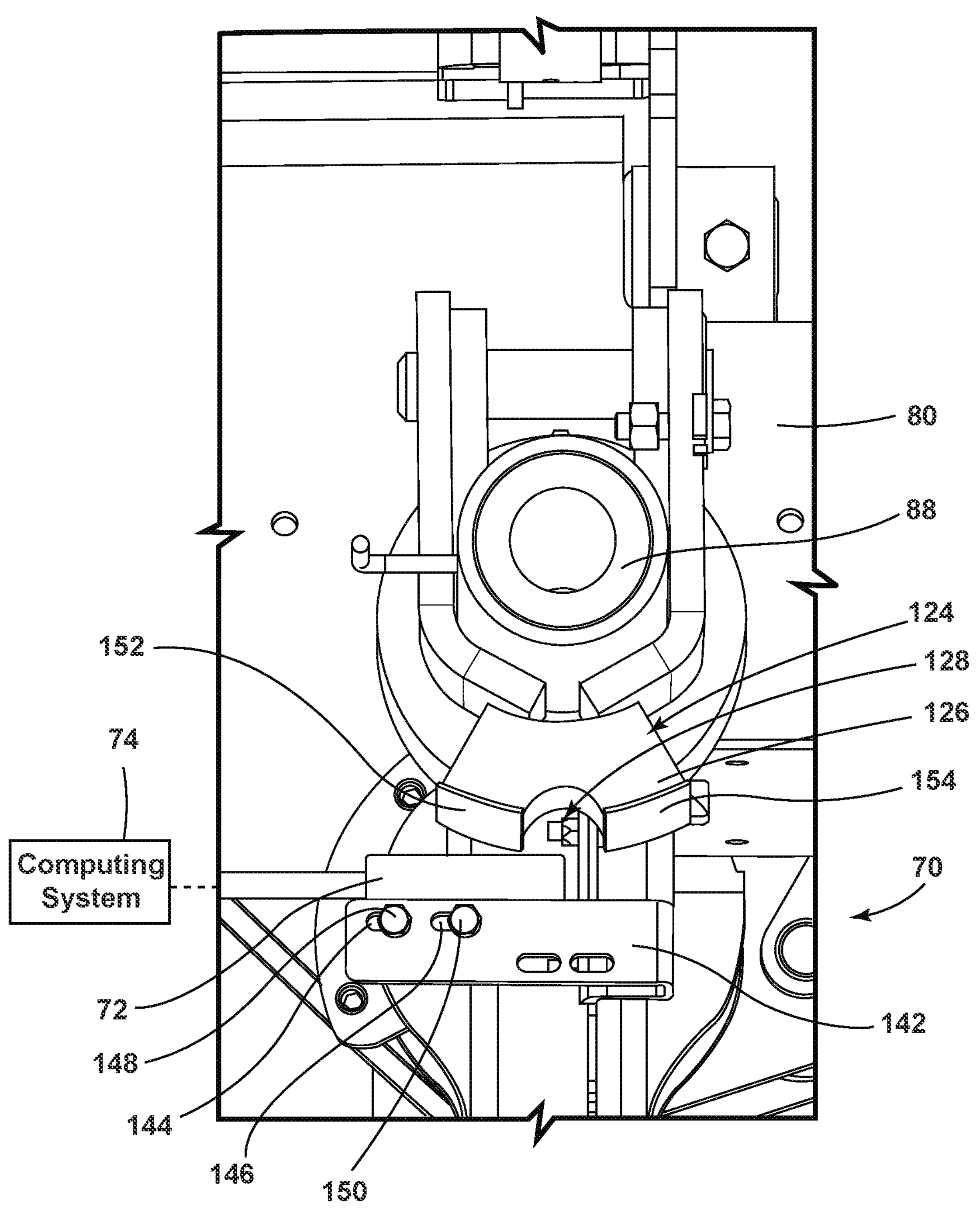
FIG. 10 is a top perspective view of the boom assembly and the adjustment system with the adjustment system including a sensor and a detector assembly in accordance with aspects of the present subject matter.

Referring to FIG. 10, a perspective view of the mounting portion 80 and the shaft 88 are illustrated in accordance with various aspects of the present disclosure. As illustrated, in some embodiments, the sensor 72 may be operably coupled with the frame 34 through a bracket 142. In some instances, the bracket 142 may define first and second slots 144, 146. First and second fasteners 148, 150 may be respectively positioned through the first and second slots 144, 146 to operably couple the sensor 72 to the bracket 142. As illustrated, the slots 144, 146 may have a width that is greater than the fastener 148, 150 such that the fasteners 148, 150 and the sensor 72 may be slid along the bracket 142, which may assist in alignment of the sensor 72 with the first boom arm 36.

As generally illustrated in FIG. 10, the detector assembly 124 may include a base 126 that defines a locating feature 128 having a predefined width. The predefined width defines the predefined angular range of the boom arm 36. The predefined angular range may be a range of angles for which the first boom arm 36 may rotate and/or deflect prior to actuation of the first actuation assembly 76 and/or the second actuation assembly 78. For example, in some embodiments, the sensor 72 may detect the proximity of the locating feature 128 versus the proximity of the base 126. As such, the locating feature 128 may be further from the sensor 72 when aligned, indicating the alignment of the boom arm 36 with the frame 34. Conversely, when the sensor 72 detects the base 126, which is closer to the sensor 72 when the boom arm 36 is rotated, can indicate that the boom arm 36 is rotated relative to the frame 34.

In some instances, a first plate 152 may be positioned on a first side portion of the locating feature 128 and a second plate 154 on a second side portion of the locating feature 128. In some instances, the first and second plates 152, 154 may be formed from a metallic material and/or any other practicable material.

Figure 11:
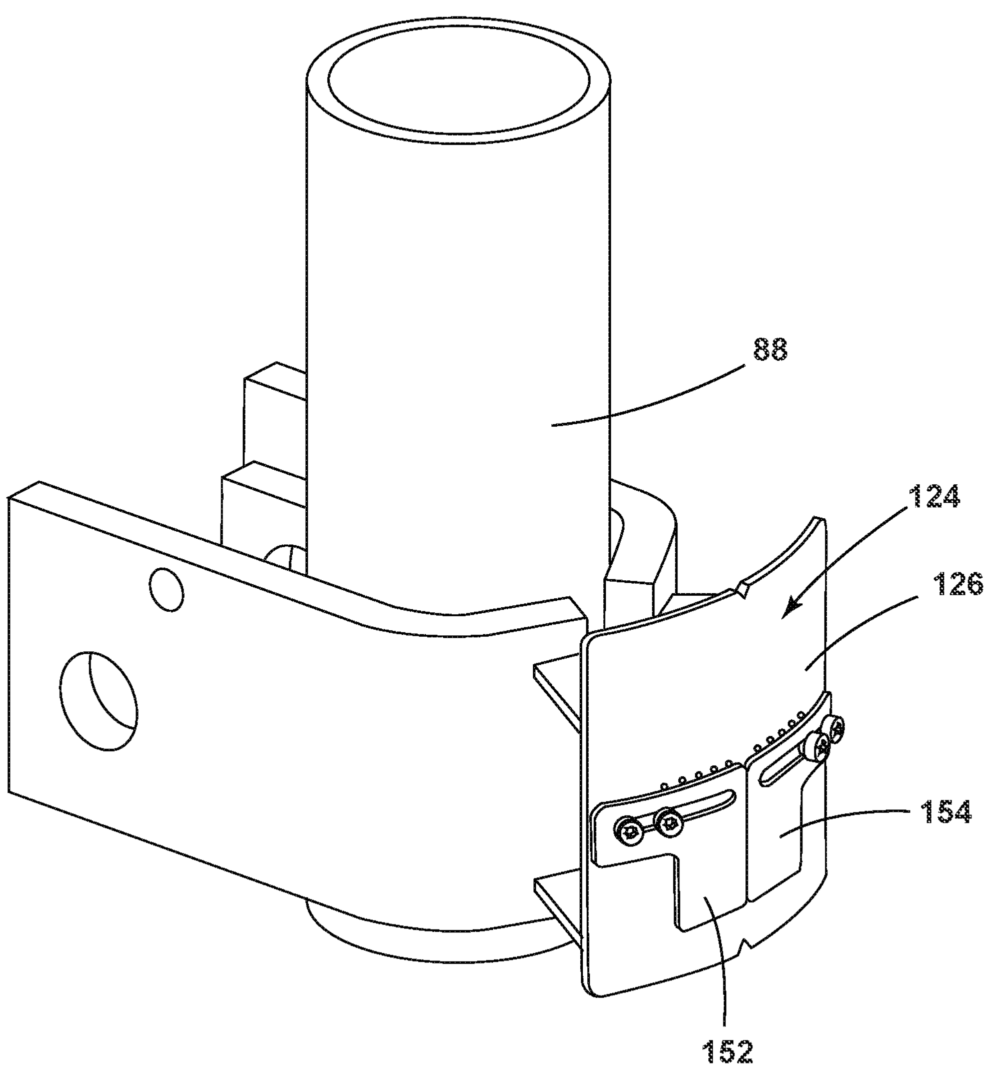
FIG. 11 is a side perspective view of the detector assembly in accordance with aspects of the present subject matter.
Figure 12:
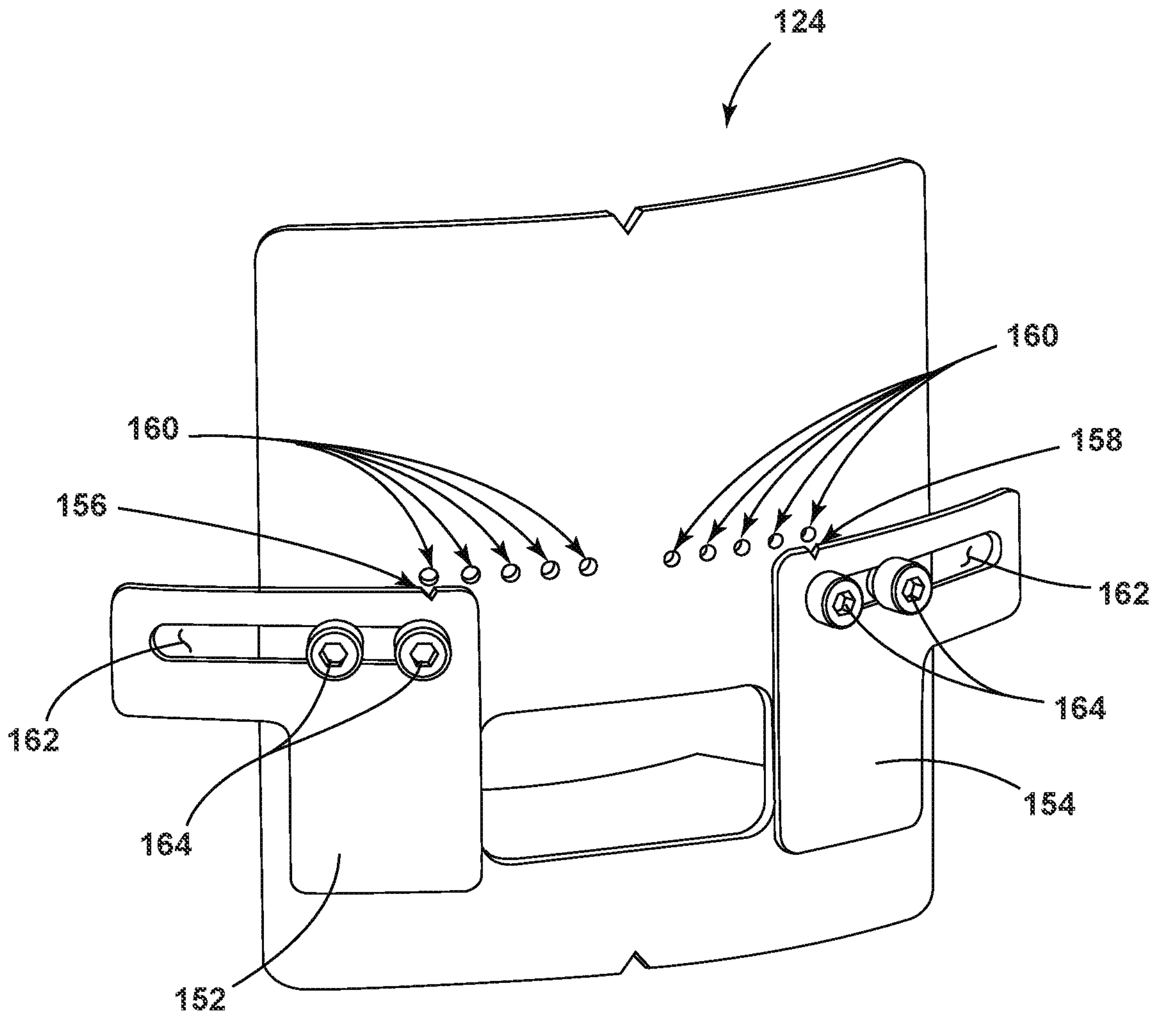
FIG. 12 is a front perspective view of the detector assembly in accordance with aspects of the present subject matter.

Referring now to FIGS. 11 and 12, perspective views of the detector assembly 124 are illustrated in accordance with various aspects of the present disclosure. As illustrated, in some embodiments, the first plate 152 can movable relative to the base 126 between a first plate first position (as exemplarily illustrated in FIG. 11) and a first plate second position (as exemplarily illustrated in FIG. 12). Likewise, the second plate 154 may be movable relative to the base 126 between a second plate first position (as exemplarily illustrated in FIG. 11) and a second plate second position (as exemplarily illustrated in FIG. 12). In general, movement of the first plate 152 or the second plate 154 can alter the predefined width of the locating feature 128. By altering the width of the locating feature 128, the predefined angular range for which the first boom arm 36 may rotate and/or deflect relative to the frame 34 prior to actuation of the first actuation assembly 76 and/or the second actuation assembly 78 may be changed.

In some embodiments, a first alignment feature 156 can be defined by the first plate 152. For example, the first alignment feature 156 may be configured as a tab that is defined by the first plate 152. Additionally or alternatively, the first alignment feature 156 may be configured as any other feature without departing from the scope of the present disclosure.

Likewise, a second alignment feature 158 defined by the second plate 154. For example, the second alignment feature 158 may be configured as a tab that is defined by the second plate 154. Additionally or alternation, the second alignment feature 158 may be configured as any other feature without departing from the scope of the present disclosure.

In the illustrated example, one or more position indicators 160 may be defined by and/or positioned on the base 126. The position indicators 160 can provide one or more defined locations from a center of the locating feature 128 that aligns the first plate 152 and the second plate 154 therewith. As illustrated, the first plate 152 and the second plate 154 may each generally define adjustment channels 162 that allow one or more fasteners 164 to be positioned therethrough. With the fasteners 164 through the adjustment channels 162 but in a released position, the first plate 152 and/or the second plate 154 may slide along the respective fasteners 164. Once the first alignment feature 156 is positioned in a defined location, which may be assisted through the position indicators 160, the fasteners 164 may be placed in a fastened position to retain the first plate 152 in the defined position. Similarly, once the second alignment feature 158 is positioned in a defined location, which may be assisted through the position indicators 160, the fasteners 164 may be placed in a fastened position to retain the second plate 154 in the defined position.

Figure 13:
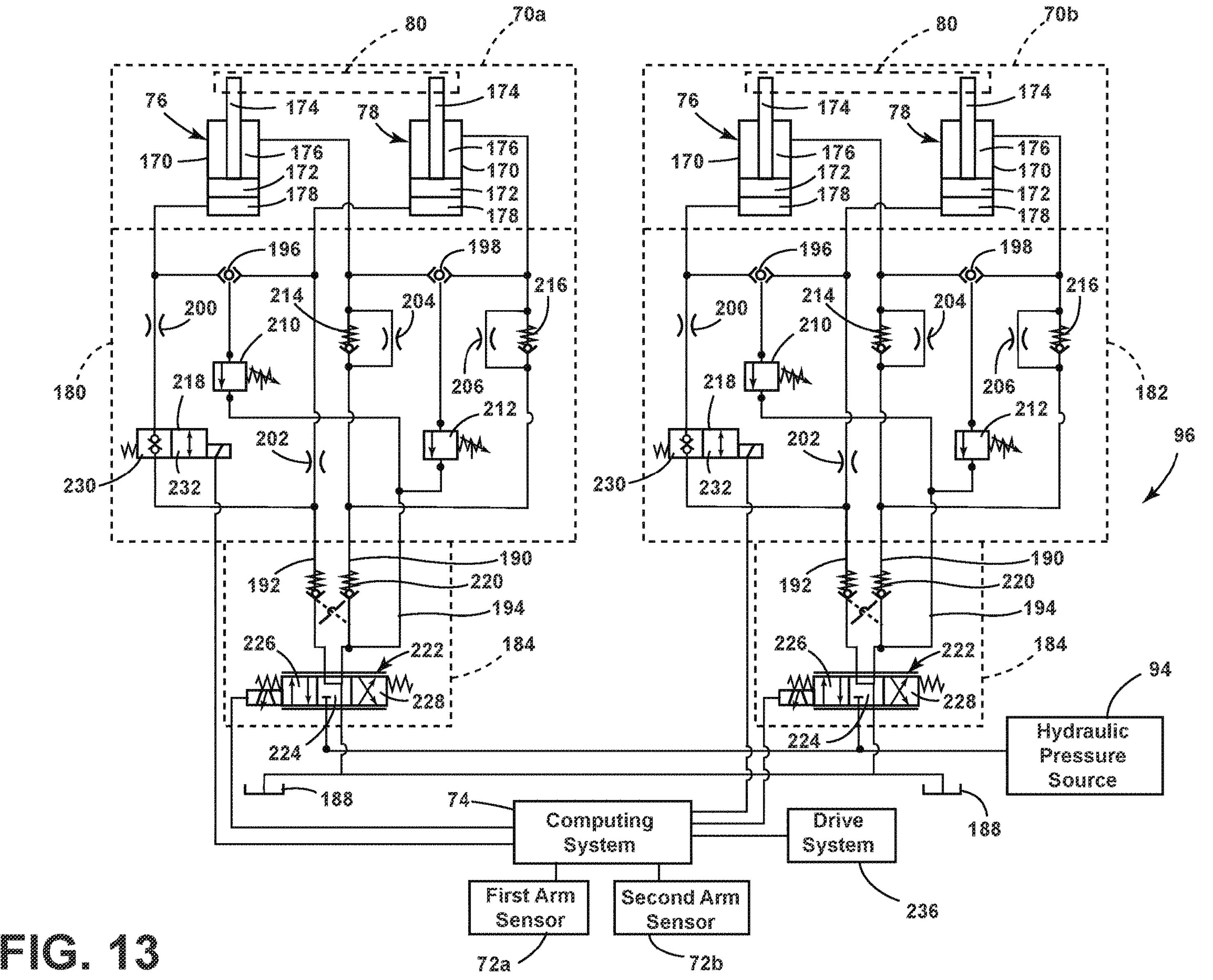
FIG. 13 is a schematic illustrating a hydraulic system operably coupled with first and second actuation assemblies of the adjustment system in accordance with aspects of the present subject matter.

Referring now to FIG. 13, a schematic drawing of the adjustment system 70 of the first boom arm 36 and the second boom arm 38 operably coupled with a hydraulic circuit 96. As noted above, the first adjustment system **70*a* may include the first actuation assembly 76 and/or the second actuation assembly 78. Likewise, the second adjustment system 70*b* may also include the first actuation assembly 76 and/or the second actuation assembly 78. Each of the first actuation assembly 76 and/or the second actuation assembly 78 of the first adjustment system 70*a* and/or the second adjustment system 70*b* be configured as a pair of dual-acting cylinder piston assemblies. In such instances, each actuation assembly can include a cylinder 170, a moveable piston 172 disposed within the cylinder 170, and a rod 174 coupled to piston 172. As provided herein, the cylinders 170 of the first actuation assembly 76 and the second actuation assembly 78 may be coupled to the frame 34 while rods 174 are respectively coupled to the mounting portions 80 of the first boom arm 36 and the second boom arm 38. As will be appreciated, this coupling arrangement may be reversed wherein the rods 174 are coupled to the frame 34 and the cylinders 170 are respectively coupled to the first boom arm 36 and the second boom arm 38**.

The pistons 172 divide the interiors of cylinders 170 into a first chamber 176 and a second chamber 178. In various embodiments, the first chambers 176 of the first adjustment system **70*a* can be located proximate to the first boom arm 36 while the second chambers 178 are located distant from the first boom arm 36. Similarly, in various embodiments, the first chambers 176 of the second adjustment assembly can be located proximate to the second boom arm 38 while the second chambers 178 are located distant from the second boom arm 38. In several embodiments, the second chambers 178 are each in fluid communication with a source 94 of hydraulic pressure, whereby the second chambers 178 are filled with hydraulic fluid to exert pressure on the pistons 172 to thereby apply force to the first boom arm 36 and/or the second boom arm 38. As noted above, each of the actuation assemblies 76, 78 of the first adjustment system 70*a* may be configured to apply torques to the first boom arm 36 when the first boom arm 36 is deflected. Similarly, each of the actuation assemblies 76, 78 of the second adjustment system 70***b* may be configured to apply torques to the second boom arm 38 when the second boom arm 38 is deflected.

In the embodiment illustrated in FIG. 13, the hydraulic circuit 96 includes first and second units 180, 182, first and second flow assemblies 184, 186, a computing system 74, a pump or hydraulic pressure source 94, a hydraulic tank or reservoir 188, a first arm sensor 72*a*, and a second arm sensor 72*b*. The units 180, 182 as well as flow assemblies 184, 186 may be configured in a generally similar manner to one another. Accordingly, for ease of illustration, the first unit 180 and the first flow assembly 184 are described in detail.

In the embodiment illustrated in FIG. 13, the first unit 180 is fluidly coupled to the first flow assembly 184 by a first fluid line 190, a second fluid line 192, and a bypass line 194. In some instances, the first unit 180 generally includes three-way check valves 196, 198, restrictor orifices 200, 202, 204, 206, first and second relief valves 210, 212, two-way check valves 214, 216, and a control valve 218.

The first flow assembly 184 controllably connects the first fluid line 190, the second fluid line 192, and the bypass line 194 to the hydraulic pressure source 94 or the reservoir 188 in response to signals from the computing system 74. The first flow assembly 184 generally includes a pilot-operated (PO) check valve 220 and a flow valve 222. In various embodiments, the flow valve 222 may be configured as a solenoid valve electrically coupled to the computing system 74. The flow valve 222 may have a spool actuatable by electric solenoids to three states or positions: an OFF position 224, a first position 226 (e.g., a position in which the first boom arm 36 is rotated aft of a current position), and a second position 228 (e.g., a position in which the first boom arm 36 is rotated fore of a current position). In the OFF position 224 (shown in FIG. 12), the flow valve 222 connects both the first fluid line 190, the second fluid line 192, and the bypass line 194 to the reservoir 188. As a result, neither the first actuation assembly 76 nor the second actuation assembly 78 is pressurized. In various embodiments, the flow valves 222 of the hydraulic circuit 96 may be biased to the OFF position 224 when the first boom arm 36 and/or the second boom arm 38 are in a folded position and/or when the transmission of sprayer 10 is in neutral.

When the first boom arm 36 is to be rotated in a first rotational direction (e.g., a position in which at least a portion of the first boom arm 36 is aft of the current position), the computing system 74 may actuate the control valve 218 to a second state 232 and the flow valve 222 to the first position 226. In some embodiments, the control valve 218 may be configured as a solenoid-operated, 2-way, normally closed, needle-type, direct-acting cartridge valve intended for blocking or load-holding in the hydraulic circuit 96. Accordingly, when the control valve 218 is in a first state 230, the control valve 218 generally blocks flow therethrough until activated. When activated, the valve is placed in a second state 232 in which flow is allowed to pass through the control valve 218.

In the first position 226, the second fluid line 192 is connected to the hydraulic pressure source 94 while the first fluid line 190 is connected to the reservoir 188. With the flow valve 222 in the first position 226, the first boom arm 36 will pivot and move the pistons 172 to thereby collapse one of first chambers 176 and expand the other of first chambers 176 of the first actuation assembly 76 and the second actuation assembly 78. For example, when the boom arm 36 is deflected in an aft direction, such as shown in FIG. 8, the rod 174 of the first actuation assembly 76 is extended, collapsing the first chamber 176 and expanding the second chamber 178. At the same time, the rod 174 of second actuation assembly 78 retracts to collapse the second chamber 178 and expands the first chamber 176. As this happens, fluid within the first chamber 176 of the first actuation assembly 76 is expelled through restrictor orifice 204 and through the first fluid line 190 to the reservoir 188. The restrictor orifice 204 restricts fluid flow to a maximum predetermined rate so as to provide controlled pivotal movement of the first boom arm 36 while deflecting. If the pressure within the collapsing first chamber 176 becomes too great, the relief valve 212 dumps fluid at a faster rate to reservoir 188 through the bypass line 194.

When the first boom arm 36 is to be rotated in a second rotational direction (e.g., a position in which at least a portion of the first boom arm 36 is fore of the current position), the computing system 74 may actuate the control valve 218 from a first state 230 (e.g., a flow restricted state) to a second state 232 (e.g., a flow allowing state) and the flow valve 222 to the second position 228. With the flow valve 222 in the second position 228, the first fluid line 190 is connected to the hydraulic pressure source 94 while the second fluid line 192 is connected to the reservoir 188. With the flow valve 222 in the second position 228, the first boom arm 36 will pivot in the second direction and move the pistons 172 to thereby collapse one of the first chambers 176 and expand the other of the first chambers 176 of the first actuation assembly 76 and the second actuation assembly 78. For example, when the boom arm 36 is deflected in a fore direction, such as shown in FIG. 9, the rod 174 of the second actuation assembly 78 is extended, collapsing the first chamber 176 and expanding the second chamber 178. At the same time, the rod 174 of first actuation assembly 76 retracts to collapse the second chamber 178 and expands the first chamber 176. As this happens, fluid within the second chamber 178 of the first actuation assembly 76 is expelled through restrictor orifice 200 and through the first fluid line 190 to the reservoir 188. The restrictor orifice 200 restricts fluid flow to a maximum predetermined rate so as to provide controlled pivotal movement of the first boom arm 36 while deflecting. If the pressure within the collapsing first chamber 176 becomes too great, the relief valve 210 dumps fluid at a faster rate to reservoir 188 through the bypass line 194.

With further reference to FIG. 12, the computing system 74 can include a control circuit that may be electrically connected to the flow valves 222 of the flow assemblies 184, 186. The computing system 74 may also be electrically connected to the control valves 218 of each unit 180, 182. In various embodiments, the computing system 74 can generate a control signal to actuate electrical solenoids of the flow valves 222 to move the spools of the flow valves 222 between the OFF position 224, the first position 226, and second position 228. Likewise, in several embodiments, the computing system 74 can generate a control signal to actuate electrical solenoids of the control valves 218 to move the spools of the control valves 218 between the first state 230 and the second state 232. It will be appreciated that the computing system 74 can be configured to individually control each flow valve 222 and control valve 218 to independently control the movement of each of the boom arms 36, 38. Moreover, in some embodiments, when the first boom arm 36 is to be rotated, the computing system 74 may be configured to actuate the flow valve 222 to a flow position (by actuating the flow valve 222 from the OFF position 224 to either the first position 226 or the second position 228) and the control valve 218 to a second state 232 (by actuating the control valve 218 from the first state 230 to the second state 232) during a common time period. Once the boom arm

36 is rotated to a defined position, the computing system 74 may be configured to actuate the flow valve 222 to an OFF position 224 (by actuating the flow valve 222 from either the first position 226 or the second position 228 to the OFF position 224) and the control valve 218 to a first state 230 (by actuating the control valve 218 from the second state 232 to a first state 230) during a common time period.

In various embodiments, the computing system 74 can generate a control signal based upon inputs from a first boom arm sensor 72*a* and/or a second boom arm sensor 72*b*. The first boom arm sensor 72*a* and the second boom arm sensor 72*b* may be generally similar to one another and sense the angular positions of the boom arms 36, 38 relative to the frame 34. As described above, may provide data indicative of the misalignment and/or the direction of misalignment to the computing system 74. In some instances, the first sensor 72*a* and/or the second sensor 72*b* may be operably coupled with the frame 34, and a detector assembly 124 may be operably coupled with the shaft 88. As such, the sensor 72 may be stationary as the first boom arm 36 rotates relative to the frame 34.

In operation, in response to receiving a signal from a drive system 236 that the speed and directional control is moved out of a neutral position and that the first boom arm 36 and/or the second boom arm 38 is in a spray position (as illustrated in FIG. 1), the computing system 74 receives data from the first sensor 72*a* and/or the second sensor 72*b* to determine whether deflection of the first boom arm 36 and/or the second boom arm 38 exists. When deflection beyond a defined threshold is detected, the computing system 74 generates a control signal causing the flow valve 222 coupled with the respective boom arm 36, 38 to move out of a normally biased OFF position 224 to the first position 226 and/or the second position 228 and the control valve 218 to move out of a normally biased OFF position 224 to the second state 232 to cause the first actuation assembly 76 and/or the second actuation assembly 78 to pivot the boom arm 36 until the boom arm 36 is in a defined position that reduces a variance.

It will be appreciated that FIG. 13 illustrates but one example embodiment of an adjustment system 70 for the sprayer 10. Various other embodiments are also contemplated within the scope of the present disclosure. For example, in lieu of the first fluid line 190, the second fluid line 192, being selectively coupled to the hydraulic pressure source 94 and the reservoir 188 by flow assemblies 184, 186, the first fluid line 190 may be permanently fluidly coupled to the reservoir 188 while the second fluid line 192 is permanently coupled to hydraulic pressure source 94. In such an alternative configuration, alternative circuits would be used to pivot the boom arms 36, 38. However, such an alternative system would still rotate the boom arms 36, 38 to the defined position after detecting deflection.

Furthermore, although the adjustment systems 70 are illustrated as being controlled by a computing system 74 having sensors 72*a*, 72*b*, the system 70 may alternatively omit sensors 72*a*, 72*b* and rely upon operator input for causing the computing system 74 to generate control signals such that flow valves 222 are moved between the OFF position 224, the first position 226 and the second position 228 and the control valve 218*s* are moved between the first state 230 and the second state 232.

Figure 14:
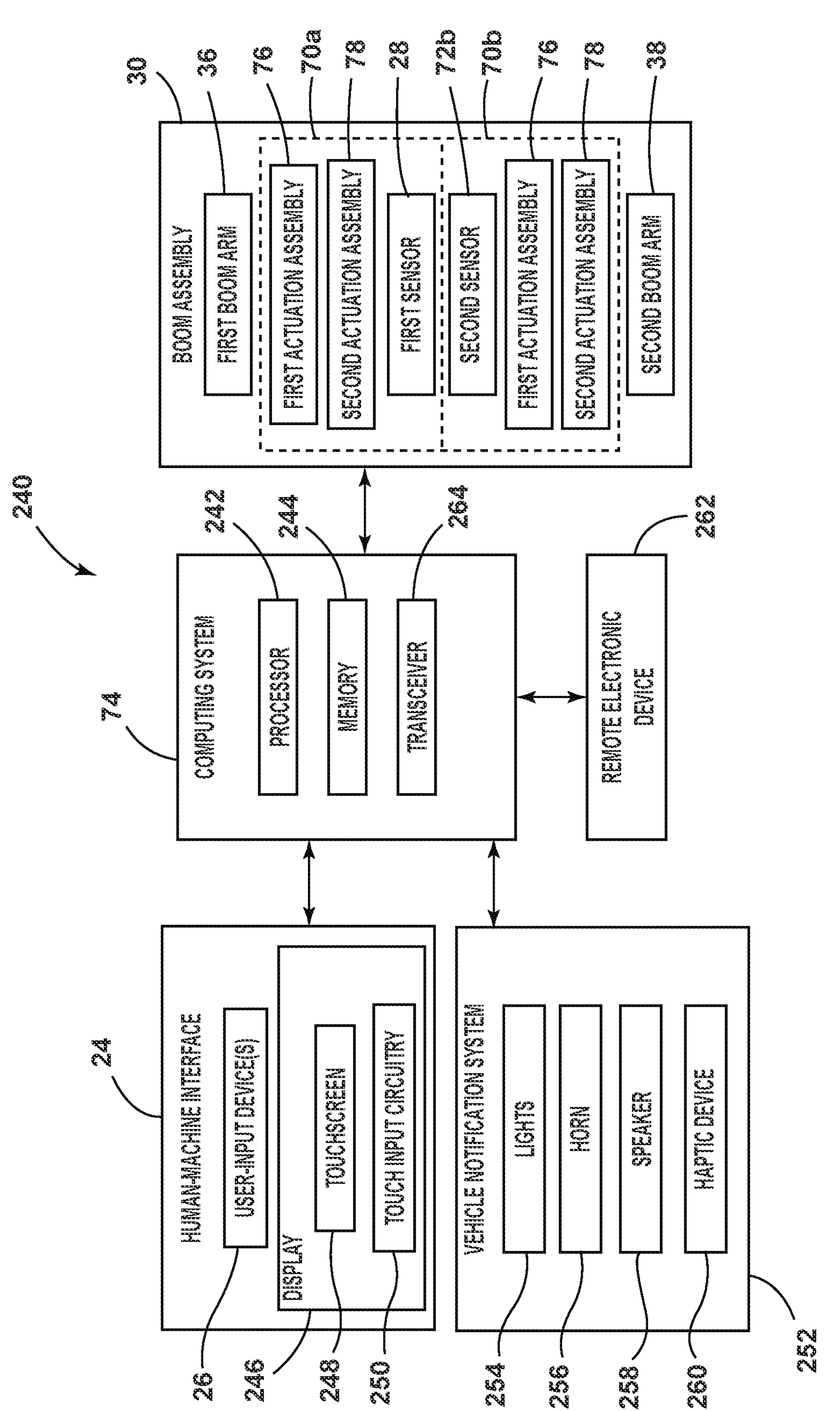
FIG. 14 illustrates a block diagram of components of a sprayer system in accordance with aspects of the present subject matter.

Referring to FIG. 14, a sprayer system 240 is illustrated in accordance with various aspects of the present subject matter. In general, the sprayer system 240 will be described herein in relation to the agricultural sprayer 10 and first and second adjustment systems 70*a*, 70*b* described above with reference to FIGS. 1-12. However, it should be appreciated that the sprayer system 240 may be advantageously utilized to control the application of the agricultural product in association with any other suitable agricultural applicator, including sprayers having any other suitable sprayer configuration.

In several embodiments, the sprayer system 240 includes the computing system 74 that receives the data of the first boom arm sensor 72*a* and controls the first actuation assembly 76 and/or the second actuation assembly 78 of the first adjustment system 70*a* when the first boom arm 36 is to be rotated based on the received data. Additionally or alternatively, the computing system 74 can receive the data of the second sensor 72*b* and control the first actuation assembly 76 and/or the second actuation assembly 78 of the second adjustment system 70*b* when the second boom arm 38 is to be rotated based on the received data.

In general, the computing system 74 may comprise one or more processor-based devices, such as a given controller or computing device or any suitable combination of controllers or computing devices. Thus, in several embodiments, the computing system 74 may include one or more processor(s) 242, and associated memory device(s) 244 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 244 of the computing system 74 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 244 may generally be configured to store suitable computer-readable instructions that, when implemented by the processor(s) 242, configure the computing system 74 to perform various computer-implemented functions, such as one or more aspects of the methods and algorithms that will be described herein. In addition, the computing system 74 may also include various other suitable components, such as a communications circuit or module, one or more input/output channels, a data/control bus, and/or the like.

It should be appreciated that the various functions of the computing system 74 may be performed by a single processor-based device or may be distributed across any number of processor-based devices, in which instance such devices may be considered to form part of the computing system 74. For instance, the functions of the computing system 74 may be distributed across multiple application-specific controllers, such as a pump controller, individual nozzle controllers, and/or the like.

Referring still to FIG. 14, each of the first sensor 72*a* and/or the second sensor 72*b* may be configured as any type of sensor that is capable of providing data that can be used to determine boom arm movement by the computing system 74.

In some examples, the HMI 24 may include a display 246 having a touchscreen 248 mounted within a cockpit module, an instrument cluster, and/or any other location of the sprayer 10. The display 246 may be capable of displaying information related to the boom assembly 30 or any other information. In some embodiments, the HMI 24 may include a user-input device 26 in the form of circuitry 250 within the touchscreen 248 to receive an input corresponding with a location over the display 246. Other forms of input, including one or more joysticks, digital input pads, or the like can be used in place or in addition to the touchscreen 248. In some instances, a predefined range for boom arm movement and/or a predefined threshold for the calculated variance v may be set, either as an initial/default range or as an operator defined value or range through the touchscreen 248 and/or any other user-input device 26. The predefined range may be agricultural product specific.

In some embodiments, a vehicle notification system 252 may prompt visual, auditory, and tactile notifications and/or warnings when the deflection magnitude exceeds a predefined range and/or if the calculated variance v deviates from a predefined range. For instance, vehicle lights 254 and/or vehicle emergency flashers may provide a visual alert. A vehicle horn 256 and/or a speaker 258 may provide an audible alert. A haptic device 260 integrated into a steering wheel, a seat, an armrest, and/or any other location may provide a tactile alert.

The sprayer system 240 may also communicate via wired and/or wireless communication with the remote electronic devices 262 through a transceiver 264. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 262 may also include a display for providing information to a user. For instance, the electronic device 262 may display one or more graphical user interfaces and may be capable of receiving remote user-inputs to set a predefined range for boom arm movement, a predefined threshold for the variance v, and/or to input any other information. In addition, the electronic device 262 may provide feedback information, such as visual, audible, and tactile alerts. It will be appreciated that the electronic device 262 may be any one of a variety of computing devices and may include a processor and memory. For example, the electronic device 262 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In some embodiments, the sprayer system 240 may also provide the operator with various mitigation techniques when the deflection magnitude exceeds a predefined range, and/or if the calculated variance v deviates from a predefined range. For example, when boom arm movement exceeds the predefined threshold thereby causing an application rate to deviate from a predefined range, the computing system 74 may provide the user with actions that may mitigate the boom arm movement, such as providing other damping measures or slowing the sprayer 10. It will be appreciated that notifications provided by the computing system 74 may include any other information relating to any other component of the sprayer 10 and/or the boom assembly 30 and mitigation instructions for mitigating any issue that may occur in relation to any component of the sprayer 10. Additionally, and/or alternatively, the computing system 74 may actively control various operations of the sprayer 10, such as by making a one-time adjustment to one or more operating parameters associated with the operation of the sprayer 10 and/or the boom assembly 30 based on the data generated by the sensor 72.

Figure 15:
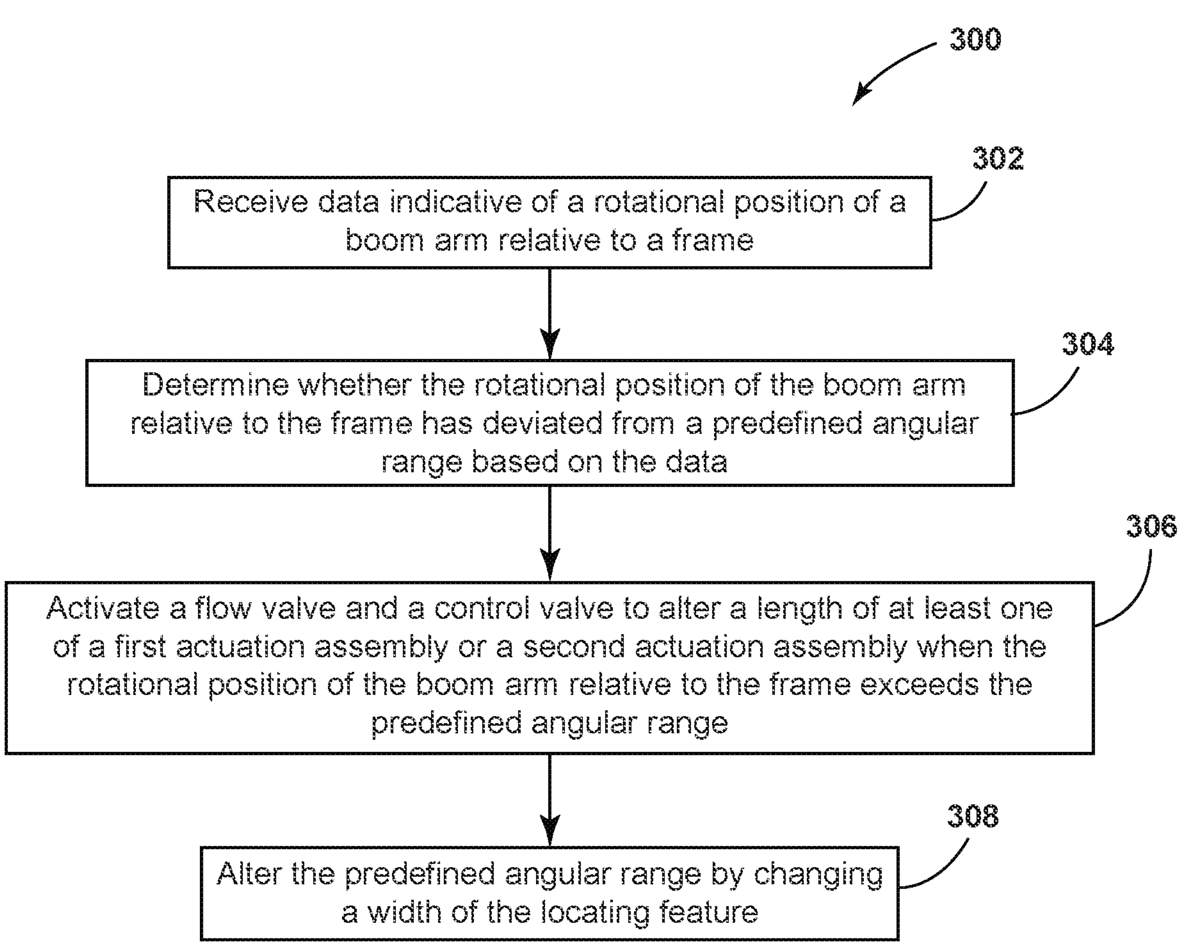
FIG. 15 illustrates a flow diagram of some embodiments of a method for operating an agricultural applicator in accordance with aspects of the present subject matter.

Referring now to FIG. 15, a flow diagram of some embodiments of a method 300 for monitoring a spray quality during an application operation is illustrated in accordance with aspects of the present subject matter. In general, the method 300 will be described herein with reference to the sprayer 10, the boom assembly 30, and the sprayer system 240 described above with reference to FIGS. 1-13. However, it should be appreciated by those of ordinary skill in the art that the disclosed method 300 may generally be utilized to monitor one or more application variables of any suitable applicator associated with any suitable agricultural sprayer 10 and/or may be utilized in connection with a system having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, the method 300 provided herein may implement closed loop (and/or open loop) strategies. For example, at step (302), the method 300 receiving, through a sensor, data indicative of a rotational position of a boom arm relative to a frame. For example, as provided herein, a sensor may be operably coupled with the boom assembly and may be configured to provide data indicative of a relative position of the boom arm relative to the frame.

At step (304), the method 300 can include determining, through a computing system, whether the rotational position of the boom arm relative to the frame has deviated from a predefined angular range based on the data.

At step (306), the method 300 can include activating, through the computing system, a flow valve, and a control valve to alter a length of at least one of a first actuation assembly or a second actuation assembly when the rotational position of the boom arm relative to the frame exceeds the predefined angular range.

In some embodiments, at step (308), the method 300 can include altering the predefined angular range by changing a width of the locating feature. For instance, a detector assembly may be optically coupled with the sensor. In some embodiments, the detector assembly may include a first plate that may be movable relative to a base between a first plate first position and a first plate second position. Further, the detector assembly may include a second plate that may be movable relative to the base between a second plate first position and a second plate second position. In general, movement of the first plate or the second plate can alter the predefined width of the locating feature. By altering the width of the locating feature, the predefined angular range for which the first boom arm may rotate and/or deflect prior to actuation of the first actuation assembly and/or the second actuation assembly may be changed.

It is to be understood that the steps of the method 300 are performed by the controller upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 300, is implemented in software code or instructions which are tangibly stored on a tangible computer-readable medium. The controller loads the software code or instructions via a direct interface with the computer-readable medium or via a wired and/or wireless network. Upon loading and executing such software code or instructions by the controller, the controller may perform any of the functionality of the controller described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A boom assembly for an agricultural applicator, the boom assembly comprising:

a frame supporting a boom arm pivotably coupled to the frame and rotatable about a first axis;

a first actuation assembly having a first end portion pivotably coupled to the frame and a second end portion pivotably coupled to the boom arm at a first pivot point for rotation about a second axis on a first side of the first axis;

a second actuation assembly having a first end portion pivotably coupled to the frame and a second end portion pivotably coupled to the boom arm at a second pivot point for rotation about a third axis on a second side of the first axis;

a sensor configured to detect data indicative of a relative position of the boom arm relative to the frame;

a detector assembly optically coupled with the sensor, wherein the detector assembly comprises a base defining a locating feature having a predefined width, wherein the predefined width defines a predefined angular range of the boom arm; and a computing system configured to activate at least one of the first actuation assembly or the second actuation assembly in response to determining that the boom arm has deviated from the predefined angular range.

2. The boom assembly of claim 1, wherein the first and second actuation assemblies are fluidly coupled with a hydraulic circuit.

3. The boom assembly of claim 2, wherein the hydraulic circuit further comprises:

a flow valve fluidly coupled with the first and second actuator assemblies and configured to selectively move between a first state, a first position, and a second position; and a control valve positioned within the hydraulic circuit, wherein the control valve is actuated from a first state to a flow position when the flow valve is placed in the first position or the second position.

4. The boom assembly of claim 3, wherein the flow valve is actuated to an OFF position when the control valve is placed in the first state.

5. The boom assembly of claim 3, further comprising:

a relief valve positioned in parallel with the control valve and configured to reduce a pressure within the hydraulic circuit when the hydraulic circuit exceeds a threshold pressure.

6. The boom assembly of claim 1, wherein the detector assembly comprises:

a first plate on a first side portion of the locating feature; and a second plate on a second side portion of the locating feature.

7. The boom assembly of claim 6, wherein the first plate is movable relative to the base between a first plate first position and a first plate second position, and the second plate is movable relative to the base between a second plate first position and a second plate second position, and wherein movement of the first plate or the second plate alters the predefined width of the locating feature.

8. The boom assembly of claim 7, wherein the detector assembly further comprises:

a first alignment feature defined by the first plate;

a second alignment feature defined by the second plate; and one or more position indicators on the base, wherein the one or more position indicators provide one or more defined locations from a center of the locating feature.

9. The boom assembly of claim 1, wherein the first actuation assembly and the second actuation assembly are each configured as dual-acting piston-cylinder assemblies.

10. The boom assembly of claim 1, wherein the agricultural applicator includes a drive assembly, and wherein the sensor is activated when the drive assembly is in a drive position.

11. A boom assembly for an agricultural applicator, the boom assembly comprising:

a frame supporting a boom arm pivotably coupled to the frame and rotatable about a first axis;

a first actuation assembly having a first end portion pivotably coupled to the frame and a second end portion pivotably coupled to the boom arm at a first pivot point for rotation about a second axis on a first side of the first axis;

a second actuation assembly having a first end portion pivotably coupled to the frame and a second end portion pivotably coupled to the boom arm at a second pivot point for rotation about a third axis on a second side of the first axis;

a sensor configured to detect data indicative of a relative position of the boom arm relative to the frame; and a detector assembly optically coupled with the sensor, the detector assembly including a base defining a locating feature having a predefined width, wherein the predefined width defines a predefined angular range of the boom arm.

12. The boom assembly of claim 11, wherein the detector assembly further comprises:

a first plate on a first side portion of the locating feature; and a second plate on a second side portion of the locating feature.

13. The boom assembly of claim 12, wherein the first plate is movable relative to the base between a first plate first position and a first plate second position, and the second plate is movable relative to the base between a second plate first position and a second plate second position, and wherein movement of the first plate or the second plate alters the predefined width of the locating feature.

14. The boom assembly of claim 12, wherein the detector assembly further comprises:

a first alignment feature defined by the first plate; and a second alignment feature defined by the second plate.

15. The boom assembly of claim 11, wherein the detector assembly further comprises:

one or more position indicators on the base, wherein the one or more position indicators provide one or more defined locations from a center of the locating feature.

16. The boom assembly of claim 11, wherein the agricultural applicator includes a drive assembly, and wherein the sensor is activated when the drive assembly is in a drive position.

17. The boom assembly of claim 11, further comprising:

a computing system configured to activate at least one of the first actuation assembly or the second actuation assembly in response to determining that the boom arm has deviated from the predefined angular range.

18. A boom assembly for an agricultural applicator, the boom assembly comprising:

a frame supporting a boom arm pivotably coupled to the frame and rotatable about a first axis;

a first actuation assembly having a first end portion pivotably coupled to the frame and a second end portion pivotably coupled to the boom arm at a first pivot point for rotation about a second axis on a first side of the first axis;

a second actuation assembly having a first end portion pivotably coupled to the frame and a second end portion pivotably coupled to the boom arm at a second pivot point for rotation about a third axis on a second side of the first axis, wherein the first and second actuation assemblies are fluidly coupled with a hydraulic circuit;

a flow valve fluidly coupled with the first and second actuator assemblies and configured to selectively move between a first state, a first position, and a second position; and a control valve positioned within the hydraulic circuit, wherein the control valve is actuated from a first state to a flow position when the flow valve is placed in the first position or the second position;

a sensor configured to detect data indicative of a relative position of the boom arm relative to the frame; and a computing system configured to activate at least one of the first actuation assembly or the second actuation assembly in response to determining that the boom arm has deviated from a predefined angular range.

19. The boom assembly of claim 18, wherein the flow valve is actuated to an OFF position when the control valve is placed in the first state.

20. The boom assembly of claim 18, further comprising:

a relief valve positioned in parallel with the control valve and configured to reduce a pressure within the hydraulic circuit when the hydraulic circuit exceeds a threshold pressure.

* * * * *